United States Patent
Kang

(10) Patent No.: US 10,244,462 B2
(45) Date of Patent: Mar. 26, 2019

(54) APPARATUS AND METHOD FOR TRANSMITTING/RECEIVING POWER TRANSMITTING UNIT PRESENCE INFORMATION IN WIRELESS CHARGING NETWORK

(71) Applicant: Samsung Electronics Co., Ltd., Suwon-si (KR)

(72) Inventor: Hyeon-Jin Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/878,814

(22) Filed: Oct. 8, 2015

(65) Prior Publication Data

US 2016/0105841 A1     Apr. 14, 2016

(30) Foreign Application Priority Data

Oct. 8, 2014 (KR) .................. 10-2014-0135787

(51) Int. Cl.
*H04W 48/00* (2009.01)
*H04W 48/16* (2009.01)
(Continued)

(52) U.S. Cl.
CPC ............. *H04W 48/16* (2013.01); *H02J 50/12* (2016.02); *H02J 50/80* (2016.02); *H04B 17/318* (2015.01);
(Continued)

(58) Field of Classification Search
CPC ...... H04B 5/0031; H04B 5/0037; H02J 50/00
(Continued)

(56) References Cited

U.S. PATENT DOCUMENTS 9,991,741 B1 * 6/2018 Bell ..................... H02J 17/00
2009/0001929 A1 1/2009 Posamentier et al.
(Continued)

FOREIGN PATENT DOCUMENTS

KR 10-2014-0115898 10/2014

OTHER PUBLICATIONS

International Search Report dated Jan. 15, 2016 corresponding to International Application No. PCT/KR2015/010673.
(Continued)

*Primary Examiner* — Wen W Huang
(74) *Attorney, Agent, or Firm* — The Farrell Law Firm, P.C.

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method for transmitting power transmitting unit (PTU) presence information is provided. The method includes receiving an advertisement message from a power receiving unit (PRU); determining whether a current state is a state that power is supplied to a resonator; and outputting PTU presence information indicating that a PTU exists, or transmitting the PTU presence information to a management server, if the current state is the state that the power is not supplied to the resonator.

15 Claims, 19 Drawing Sheets

(51) Int. Cl.
*H04W 4/70* (2018.01)
*H04W 4/80* (2018.01)
*H04B 17/318* (2015.01)
*H04W 4/02* (2018.01)
*H02J 50/12* (2016.01)
*H02J 50/80* (2016.01)
*H02J 7/02* (2016.01)

(52) U.S. Cl.
CPC ............. *H04W 4/023* (2013.01); *H04W 4/70* (2018.02); *H04W 4/80* (2018.02); *H02J 7/025* (2013.01)

(58) Field of Classification Search
USPC ...................... 455/41.1, 41.2, 41.3
See application file for complete search history.

(56) References Cited

U.S. PATENT DOCUMENTS

| | | | |
|---|---|---|---|
| 2011/0184888 A1 | 7/2011 | Lee et al. | |
| 2011/0235800 A1* | 9/2011 | Furukawa | H04B 5/0037 380/33 |
| 2012/0214462 A1 | 8/2012 | Chu et al. | |
| 2012/0248891 A1* | 10/2012 | Drennen | H02J 7/025 307/104 |
| 2013/0127255 A1* | 5/2013 | Tsujimoto | H04B 5/0087 307/104 |
| 2013/0257365 A1* | 10/2013 | Redding | H02J 5/005 320/108 |
| 2013/0288600 A1 | 10/2013 | Kuusilinna et al. | |
| 2014/0071571 A1* | 3/2014 | Tseng | H04B 5/0037 361/91.1 |
| 2014/0128107 A1 | 5/2014 | An | |
| 2014/0159653 A1 | 6/2014 | Von Novak et al. | |
| 2014/0285143 A1 | 9/2014 | Kwon et al. | |
| 2014/0292095 A1* | 10/2014 | Tsukamoto | H04B 5/0037 307/104 |
| 2014/0361735 A1* | 12/2014 | Li | H02J 7/025 320/108 |
| 2015/0023204 A1* | 1/2015 | Wik | H04W 48/14 370/254 |
| 2015/0256226 A1* | 9/2015 | Lin | H04B 5/0037 307/104 |
| 2015/0326025 A1* | 11/2015 | Bell | H04W 4/008 307/104 |
| 2016/0012695 A1* | 1/2016 | Bell | G08B 13/2402 340/572.1 |
| 2016/0020649 A1* | 1/2016 | Bell | H02J 17/00 307/104 |
| 2016/0020830 A1* | 1/2016 | Bell | H04B 5/0037 307/104 |
| 2016/0087486 A1* | 3/2016 | Pogorelik | H02J 7/025 320/108 |
| 2016/0126752 A1* | 5/2016 | Vuori | H02J 7/04 307/104 |

OTHER PUBLICATIONS

Written Opinion of the International Searching Authority dated Jan. 15, 2016 corresponding to International Application No. PCT/KR2015/010673.
A4WP Wireless Power Transfer System Baseline System Specification (BSS), Alliance for Wireless Power, Ver.1.1.2, Nov. 14, 2013.

* cited by examiner

APPARATUS AND METHOD FOR TRANSMITTING/RECEIVING POWER TRANSMITTING UNIT PRESENCE INFORMATION IN WIRELESS CHARGING NETWORK

RELATED APPLICATION

This application claims the benefit under 35 U.S.C. § 119(a) of a Korean patent application filed in the Korean Intellectual Property Office on Oct. 8, 2014 assigned Serial No. 10-2014-0135787, the entire disclosure of which is incorporated herein by reference.

TECHNICAL FIELD

The present disclosure relates to an apparatus and method for transmitting/receiving power transmitting unit (PTU) presence information in a wireless charging network, and more particularly, to an apparatus and method for transmitting/receiving PTU presence information based on a Bluetooth low energy (BLE) scheme in a wireless charging network.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Mobile terminals such as a mobile phone, a personal digital assistant (PDA) and the like are driven with rechargeable batteries due to their nature, and the battery of the mobile terminal is charged through supplied electronic energy by using a separate charging apparatus. In general, separate contact terminals are arranged outside of the charging apparatus and the battery, and the charging apparatus and the battery are electrically connected to each other through contact between the contact terminals.

However, since the contact terminal of each of the charging apparatus and the battery is outwardly protruded in such a contact type charging scheme, the contact terminal is easily contaminated by a rogue object and thus the battery charging is not correctly performed. Further, the battery charging may also not be correctly performed in a case where the contact terminal is exposed to moisture.

Recently, various charging schemes such as a wireless charging scheme, a non-contact charging scheme, and the like have been developed and used for electronic devices to prevent abnormal charging in the contact type charging scheme.

Such a wireless charging scheme is based on wireless power transmission/reception, and corresponds to, for example, a system in which a battery can be automatically charged if the battery is laid on a charging pad without the need of a connection between the mobile phone and a separate charging connector. In general, the wireless charging scheme is known to be found in wireless electrical toothbrushes or wireless electric shavers. Accordingly, a waterproof function can be improved since electronic products are wirelessly charged through the wireless charging scheme, and the portability of electronic devices can be increased since there is no need to provide a wired charging apparatus. Therefore, schemes related to the wireless charging scheme are expected to be significantly developed in the coming age of electric cars.

The wireless charging scheme largely includes an electromagnetic induction scheme using a coil, a resonance scheme using a resonance, and a radio frequency (RF)/microwave radiation scheme converting electrical energy to a microwave and then transmitting the microwave.

Up to now, the electromagnetic induction scheme is considered mainstream, but it is expected that the day will come when all electronic products are wirelessly charged, anytime and anywhere, without a wire in the near future. The expectation is strengthened due to recent successful experiments that wirelessly transmitted power to a destination spaced away by dozens of meters through the use of microwaves at home and abroad.

The electromagnetic induction scheme transmits electric power between a primary coil and a secondary coil. When a magnet is moved in a coil, an induction current occurs. By using the induction current, a magnetic field is generated at a transferring end, and electric current is induced according to a change of the magnetic field so as to make energy at a reception end. The phenomenon is referred to as magnetic induction, and the electromagnetic induction scheme using magnetic induction has high energy transmission efficiency.

With respect to the resonance scheme, Prof. Soljacic of Massachusetts Institute of Technology (MIT) announced a system in which electricity is wirelessly transferred using an electric power transmission principle of the resonance scheme based on a coupled mode theory to allow a device to be charged even when the device is separated from a charging device by several meters (m). The MIT team's wireless charging system employs resonance, which is the tendency for a tuning fork to oscillate at a particular frequency causing a wine glass next to the tuning fork to oscillate at the same frequency. The research team makes an electromagnetic wave containing resonating electrical energy instead of making resonating sounds. The resonating electrical energy is directly transferred only when there is a device having a resonance frequency and having parts of electrical energy which are not used and instead are reabsorbed into an electromagnetic field. Since the electrical energy is reabsorbed into an electromagnetic field instead of spreading in the air, unlike other electromagnetic waves, the electrical energy does not affect surrounding devices or people.

Meanwhile, a power receiving unit (PRU) wirelessly receives power from a PTU. In order to normally receive the power from the PTU, the PTU needs to exist within a range that it is possible to perform a wireless charging operation with the PTU. So, in order for the PRU to exist within the range that it is possible to perform the wireless charging operation with the PTU, the PTU needs to detect information regarding whether the PTU exists.

However, in wireless charging schemes which have been proposed up to now, a PTU does not inform a location of the PTU, so a PRU may not detect whether the PTU exists.

For example, a PRU may be a mobile station, and a PTU may be a wireless charging apparatus. Generally, the wireless charging apparatus is located at the interior or exterior of a building, and does not transmit information indicating that the wireless charging apparatus exists. So, a user of the mobile station does not discover the wireless charging apparatus, and the user suffers the inconvenience of wandering in or out of the building in order to discover the location of the wireless charging apparatus. Thus, the user of the mobile station may not discover the wireless charging apparatus at all. In this case, the user of the mobile station may not get to charge a battery of the mobile station.

So, there is a need for a scheme to transmit/receive PTU presence information in a wireless charging network.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to propose an apparatus and method for transmitting/receiving power transmitting unit (PTU) presence information in a wireless charging network.

Another aspect of the present disclosure is to propose an apparatus and method for transmitting/receiving PTU presence information based on a Bluetooth Low Energy (BLE) scheme in a wireless charging network.

Another aspect of the present disclosure is to propose an apparatus and method for transmitting/receiving PTU presence information thereby enabling transmitting/receiving PTU presence information when power is supplied to a resonator included in a PTU in a wireless charging network.

Another aspect of the present disclosure is to propose an apparatus and method for transmitting/receiving PTU presence information thereby enabling transmitting/receiving PTU presence information even though power is supplied to a resonator included in a PTU, receiving a signal strength of an advertisement message from a PRU and determining whether the received signal strength is less than a threshold received signal strength in a wireless charging network.

In accordance with an aspect of the present disclosure, a method for transmitting power transmitting unit (PTU) presence information in a wireless charging network is provided. The method includes receiving an advertisement message from a power receiving unit (PRU); determining whether a current state is a state that power is not supplied to a resonator; and outputting PTU presence information indicating that a PTU exists, or transmitting the PTU presence information to a management server, if the current state is the state that the power is supplied to the resonator.

In accordance with another aspect of the present disclosure, a method for transmitting power transmitting unit (PTU) presence information in a wireless charging network is provided. The method includes receiving an advertisement message from a power receiving unit (PRU); determining whether a current state is a state that power is not supplied to a resonator; determining whether received signal strength of the advertisement message received from the PRU is greater than or equal to threshold received signal strength if the current state is the state that the power is supplied to the resonator; and outputting PTU presence information indicating that a PTU exists if the received signal strength of the advertisement message received from the PRU is greater than or equal to the threshold received signal strength.

In accordance with another aspect of the present disclosure, a method for receiving power transmitting unit (PTU) presence information in a wireless charging network is provided. The method includes transmitting an advertisement message to a PTU; and receiving PTU presence information from a management server, wherein the PTU presence information is transmitted to the management server if a state of the PTU is a state that power is supplied to a resonator when the PTU corresponding to the PTU presence information receives the advertisement message from a power receiving unit (PRU).

In accordance with another aspect of the present disclosure, a method for receiving power transmitting unit (PTU) presence information in a wireless charging network is provided. The method includes transmitting an advertisement message to a PTU; and receiving PTU presence information from a management server, wherein the PTU presence information is transmitted to the management server if a state of the PTU is a state that power is supplied to a resonator and received signal strength which is received in the PTU is less than threshold received signal strength when the PTU corresponding to the PTU presence information receives the advertisement message from a power receiving unit (PRU).

In accordance with another aspect of the present disclosure, a method for transmitting/receiving power transmitting unit (PTU) presence information in a wireless charging network is provided. The method includes receiving PTU presence information from a PTU; and transmitting the PTU presence information to a power receiving unit (PRU), wherein the PTU presence information is transmitted to a management server if a state of the PTU is a state that power is supplied to a resonator when the PTU corresponding to the PTU presence information receives an advertisement message from the PRU.

In accordance with another aspect of the present disclosure, a method for transmitting/receiving power transmitting unit (PTU) presence information in a wireless charging network is provided. The method includes receiving PTU presence information from a PTU; and transmitting the PTU presence information to a power receiving unit (PRU), wherein the PTU presence information is transmitted to a management server if a state of the PTU is a state that power is supplied to a resonator and received signal strength of an advertisement message which the PTU receives is less than threshold received signal strength when the PTU corresponding to the PTU presence information receives the advertisement message from the PRU.

In accordance with another aspect of the present disclosure, a power transmitting unit (PTU) in a wireless charging network is provided. The PTU includes a receiver configured to perform an operation of receiving an advertisement message from a power receiving unit (PRU); and a controller configured to perform an operation of determining whether a current state is a state that power is not supplied to a resonator, and an operation of outputting PTU presence information indicating that a PTU exists, or transmitting the PTU presence information to a management server, if the current state is the state that the power is supplied to the resonator.

In accordance with another aspect of the present disclosure, a power transmitting unit (PTU) in a wireless charging network is provided. The PTU includes a receiver configured to perform an operation of receiving an advertisement message from a power receiving unit (PRU); and a controller configured to perform an operation of determining whether a current state is a state that power is not supplied to a resonator, an operation of determining whether received signal strength of the advertisement message received from the PRU is greater than or equal to threshold received signal strength if the current state is the state that the power is supplied to the resonator, and an operation of controlling to output PTU presence information indicating that a PTU exists if the received signal strength of the advertisement message received from the PRU is greater than or equal to the threshold received signal strength.

In accordance with another aspect of the present disclosure, a power receiving unit (PRU) in a wireless charging network is provided. The PRU includes a transmitter configured to perform an operation of transmitting an advertisement message to a power transmitting unit (PTU); and a receiver configured to perform an operation of receiving PTU presence information from a management server, wherein the PTU presence information is transmitted to the management server if a state of the PTU is a state that power is supplied to a resonator when the PTU corresponding to the PTU presence information receives the advertisement message from the PRU.

In accordance with another aspect of the present disclosure, a power receiving unit (PRU) in a wireless charging network is provided. The PRU includes a transmitter configured to perform an operation of transmitting an advertisement message to a power transmitting unit (PTU); and a receiver configured to perform an operation of receiving PTU presence information from a management server, wherein the PTU presence information is transmitted to the management server if a state of the PTU is a state that power is supplied to a resonator and a received signal strength received in the PTU is less than a threshold received signal strength when the PTU corresponding to the PTU presence information receives the advertisement message from the PRU.

In accordance with another aspect of the present disclosure, a management server in a wireless charging network is provided. The management server includes a receiver configured to perform an operation of receiving power transmitting unit (PTU) presence information from a PTU; and a transmitter configured to perform an operation of transmitting the PTU presence information to a power receiving unit (PRU), wherein the PTU presence information is transmitted to a management server if a state of the PTU is a state that power is supplied to a resonator when the PTU corresponding to the PTU presence information receives an advertisement message from the PRU.

In accordance with another aspect of the present disclosure, a management server in a wireless charging network is provided. The management server includes a receiver configured to perform an operation of receiving power transmitting unit (PTU) presence information from a PTU; and a transmitter configured to perform an operation of transmitting the PTU presence information to a power receiving unit (PRU), wherein the PTU presence information is transmitted to a management server if a state of the PTU is a state that power is supplied to a resonator and received signal strength of an advertisement message which the PTU receives is less than threshold received signal strength when the PTU corresponding to the PTU presence information receives the advertisement message from the PRU.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
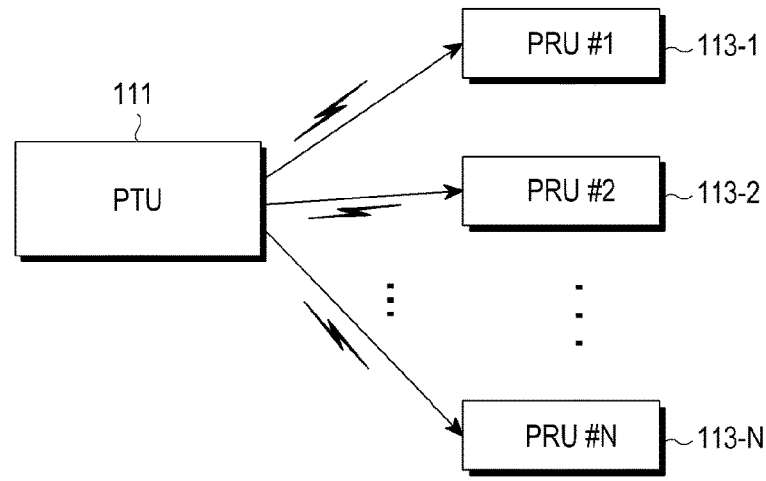
FIG. 1 schematically illustrates a structure of a wireless charging network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a power receiving unit (PRU) may be an electronic device.

An embodiment of the present disclosure proposes an apparatus and method for transmitting/receiving power transmitting unit (PTU) presence information in a wireless charging network.

An embodiment of the present disclosure proposes an apparatus and method for transmitting/receiving PTU presence information based on a Bluetooth low energy (BLE) scheme in a wireless charging network.

An embodiment of the present disclosure proposes an apparatus and method for transmitting/receiving PTU presence information thereby enabling transmitting/receiving PTU presence information when power is supplied to a resonator included in a PTU in a wireless charging network.

An embodiment of the present disclosure proposes an apparatus and method for transmitting/receiving PTU presence information thereby enabling transmitting/receiving PTU presence information even though power is supplied to a resonator included in a PTU and a received signal strength of an advertisement message received from a PRU is less than a threshold received signal strength in a wireless charging network.

A method and apparatus proposed in various embodiments of the present disclosure may be applied to various mobile communication systems such as a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) 802.16m communication system, an IEEE 802.11 communication system, an Evolved Packet System (EPS), a Mobile Internet Protocol (Mobile IP) system, a Wireless Universal Serial Bus (Wireless USB) system and/or the like.

In an embodiment of the present disclosure, it will be assumed that a wireless charging network uses a wireless charging scheme which is based on an Alliance for Wireless Power (A4WP) standard. In an embodiment of the present disclosure, a PRU detects a PTU based on a discovery scheme proposed in the BLE scheme. Here, the discovery scheme is a scheme of discovering neighbor devices during a long beacon period.

Firstly, a concept of a wireless charging system which may be applied to an embodiment of the present disclosure will be described with reference to FIGS. 1 to 11, and methods of transmitting/receiving PTU presence information according to various embodiments of the present disclosure will be described with reference to FIGS. 12 to 26.

A structure of a wireless charging network according to an embodiment of the present disclosure will be described with reference to FIG. 1.

FIG. 1 schematically illustrates a structure of a wireless charging network according to an embodiment of the present disclosure.

Referring to FIG. 1, the wireless charging network includes a PTU 111, and at least one PRU, e.g., N PRUs, i.e., a PRU#1 113-1, a PRU#2 113-2, . . . , a PRU#N 113-N.

The PTU 111 wirelessly transmits power to each of the PRU#1 113-1, the PRU#2 113-2, . . . , the PRU#N 113-N. The PTU 111 may wirelessly transmit power to a PRU which is authenticated through a preset authentication procedure.

The PTU 111 establishes a wireless connection with each of the PRU#1 113-1, the PRU#2 113-2, . . . , the PRU#N 113-N. For example, the PTU 111 may transmit wireless power to each of the PRU#1 113-1, the PRU#2 113-2, . . . , the PRU#N 113-N through an electromagnetic wave.

Each of the PRU#1 113-1, the PRU#2 113-2, . . . , the PRU#N 113-N receives wireless power from the PTU 111 to perform charging for a battery included in each of the PRU#1 113-1, the PRU#2 113-2, . . . , the PRU#N 113-N. Each of the PRU#1 113-1, the PRU#2 113-2, . . . , the PRU#N 113-N transmits a message including at least one of a request for transmitting wireless power, information necessary for receiving wireless power, state information of each of the PRU#1 113-1, the PRU#2 113-2, . . . , the PRU#N 113-N, information for controlling the PTU 111 (i.e., control information), and the like to the PTU 111.

Likewise, the PTU 111 transmits a message including at least one of state information of the PTU 111, information for controlling each of the PRU#1 113-1, the PRU#2 113-2, . . . , the PRU#N 113-N (i.e., control information), and the like to each of the PRU#1 113-1, the PRU#2 113-2, . . . , the PRU#N 113-N.

Each of the PRU#1 113-1, the PRU#2 113-2, . . . , the PRU#N 113-N transmits a message indicating a charging state to the PTU 111.

The PTU 111 includes a display unit, and displays a state of each of the PRU#1 113-1, the PRU#2 113-2, . . . , the PRU#N 113-N based on a message received from each of the PRU#1 113-1, the PRU#2 113-2, . . . , the PRU#N 113-N. The PTU 111 may display information on the amount of time that is expected until charging for each of the PRU#1 113-1, the PRU#2 113-2, . . . , the PRU#N 113-N is completed.

The PTU 111 transmits a control signal (or a control message) that controls to disable a wireless charging function to each of the PRU#1 113-1, the PRU#2 113-2, . . . , the PRU#N 113-N. A related PRU receives the control signal, which controls to disable the wireless charging function from the PTU 111, and disables the wireless charging function.

A structure of a wireless charging network according to an embodiment of the present disclosure has been described with reference to FIG. 1, and an example of an inner structure of each of a PTU and a PRU in a wireless charging network according to an embodiment of the present disclosure will be described with reference to FIG. 2.

Figure 2:
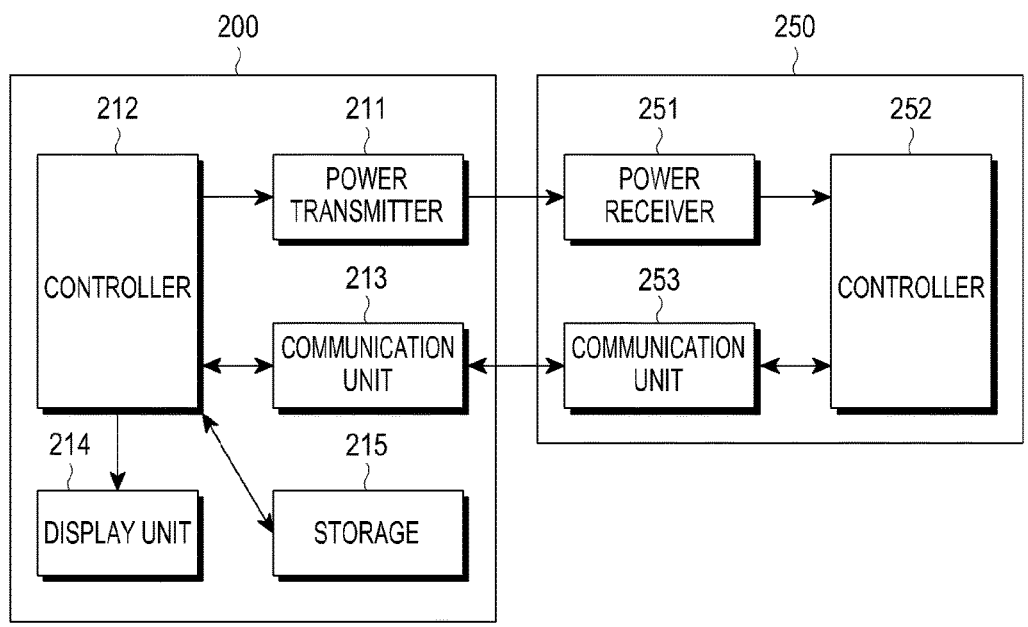
FIG. 2 schematically illustrates an example of an inner structure of each of a PTU and a PRU in a wireless charging network according to an embodiment of the present disclosure.

FIG. 2 schematically illustrates an example of an inner structure of each of a PTU and a PRU in a wireless charging network according to an embodiment of the present disclosure.

Referring to FIG. 2, a PTU 200 includes a power transmitter 211, a controller 212, a communication unit 213, a display unit 214, and a storage 215. A PRU 250 includes a power receiver 251, a controller 252, and a communication unit 253.

The power transmitter 211 supplies power which the PTU 200 requests, and wirelessly supplies the power to the PRU 250. The power transmitter 211 may supply the power in an alternating current (AC) waveform, or convert the power of a direct current (DC) waveform into power of the AC waveform using an inverter to supply the power in the AC waveform.

The power transmitter 211 may be implemented in a form of an embedded battery or in a form of a power receiving interface so as to receive power from outside thereof and supply the power to the other components. It will be easily understood by those skilled in the art that the power transmitter 211 is not limited to supplying power in AC waves.

The controller 212 controls the overall operation of the PTU 200. The controller 212 may control the overall operation of the PTU 200 based on an algorithm, a program, or an application requested by a control, which is read from the storage unit 215. The controller 212 may be implemented in a form such as central processing unit (CPU), a microprocessor, or a mini-computer.

The communication unit 213 communicates with the PRU 250 based on a preset scheme. The communication unit 213 receives power information from the PRU 250. Here, the power information includes at least one of a capacity of the PRU 250, a residual amount of the battery, a number of times of charging, an amount of use, a battery capacity, a proportion of the remaining battery capacity, and the like. Further, the communication unit 213 transmits a charging function control signal controlling a charging function of the PRU 250. The charging function control signal may be a control signal of controlling the power receiver 251 included in the PRU 250 so as to enable or disable the charging function. The power information may include information on at least one of an insertion of a wire charging terminal, a transition from a stand-alone (SA) mode into a non-stand-alone (NSA) mode, error state release, and the like.

The communication unit 213 may receive a signal from another PTU (not shown in FIG. 2) as well as the PRU 250.

The controller 212 displays a state of the PRU 250 based on the message which is received from the PRU 250 through the communication unit 213 on the display unit 214. The controller 212 may display time that it is expected until the PRU 250 is fully charged on the display unit 214.

While the power transmitter 211, the controller 212, the communication unit 213, the display unit 214, and the storage 215 are described as separate units, it is to be understood that this is merely for convenience of description. In other words, two or more of the power transmitter 211, the controller 212, the communication unit 213, the display unit 214, and the storage 215 may be incorporated into a single unit.

While the power receiver 251, the controller 252, and the communication unit 253 are described as separate units, it is to be understood that this is merely for convenience of description. In other words, two or more of the power receiver 251, the controller 252, and the communication unit 253 may be incorporated into a single unit.

An example of an inner structure of each of a PTU and a PRU in a wireless charging network according to an embodiment of the present disclosure has been described with reference to FIG. 2, and another example of an inner structure of each of a PTU and a PRU in a wireless charging network according to an embodiment of the present disclosure will be described with reference to FIG. 3.

Figure 3:
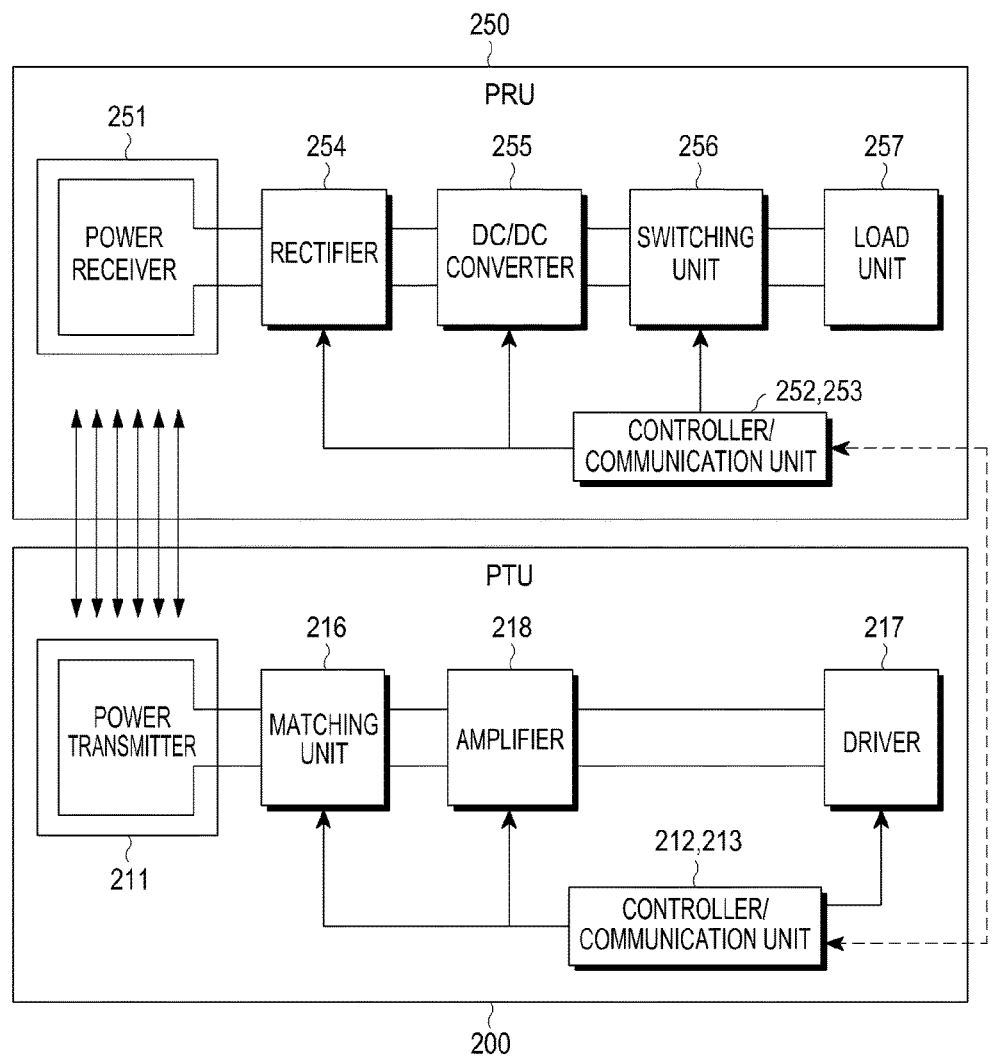
FIG. 3 schematically illustrates another example of an inner structure of each of a PTU and a PRU in a wireless charging network according to an embodiment of the present disclosure.

FIG. 3 schematically illustrates another example of an inner structure of each of a PTU and a PRU in a wireless charging network according to an embodiment of the present disclosure.

Referring to FIG. 3, a PTU 200 includes a power transmitter 211, a controller/communication unit (MCU & Out-of-band Signaling) 212/213, a driver (Power Supply) 217, an amplifier (Power Amp) 218, and a matching unit (Matching Circuit) 216. A PRU 250 includes a power receiver 251, a controller/communication unit 252/253, a rectifier 254, a DC/DC converter 255, a switching unit (Switch) 256, and a load unit (Client Device Load) 257.

The driver 217 outputs DC power having a preset voltage value. The voltage value of the DC power output from the driver 217 may be controlled by the controller/communication unit 212/213.

The DC power output from the driver 217 is output to the amplifier 218. The amplifier 218 amplifies the DC power by a preset gain. Further, the amplifier 218 converts the DC power into AC power based on a signal input from the controller/communication unit 212/213. So, the amplifier 218 outputs the AC power.

The matching unit 216 performs impedance matching. For example, the matching unit 216 may adjust impedance viewed from the matching unit 216 to control output power to be high efficient or high output power. The matching unit 216 may also adjust impedance based on a control of the controller/communication unit 212/213. The matching unit 216 includes at least one of a coil and a capacitor. The controller/communication unit 212/213 controls a connection state with at least one of the coil and the capacitor, and accordingly, performs impedance matching.

The power transmitter 211 transmits input AC power to the power receiver 251. The power transmitter 211 and the power receiver 251 may be implemented with resonance circuits which have the same resonance frequency. For example, the resonance frequency may be determined to be 6.78 MHz.

Meanwhile, the controller/communication unit 212/213 communicate with the controller/communication unit 252/253 included in the PRU 250, and perform a communication (WiFi, ZigBee, or BT/BLE), for example, with a bi-directional 2.4 GHz frequency.

The power receiver 251 receives charging power.

The rectifier 254 rectifies wireless power received by the power receiver 251 in the form of DC, and is implemented in a form of bridge diode. The DC/DC converter 255 converts the rectified power based on a preset gain. For example, the DC/DC converter 255 converts the rectified power so that a voltage of an output end becomes 5V. Meanwhile, a minimum value and a maximum value of a voltage which may be applied may be preset for a front end of the DC/DC converter 255.

The switching unit 256 connects the DC/DC converter 255 to the load unit 257. The switching unit 256 may be held in an on/off state under a control of the controller 252. Here, the switching unit 256 may be omitted. If the switching unit 256 is in an on state, the load unit 257 may store converted power which is input from the DC/DC converter 255.

Another example of an inner structure of each of a PTU and a PRU in a wireless charging network according to an embodiment of the present disclosure has been described with reference to FIG. 3, and an example of an operation between a PTU and a PRU in a wireless charging network according to an embodiment of the present disclosure will be described with reference to FIG. 4.

Figure 4:
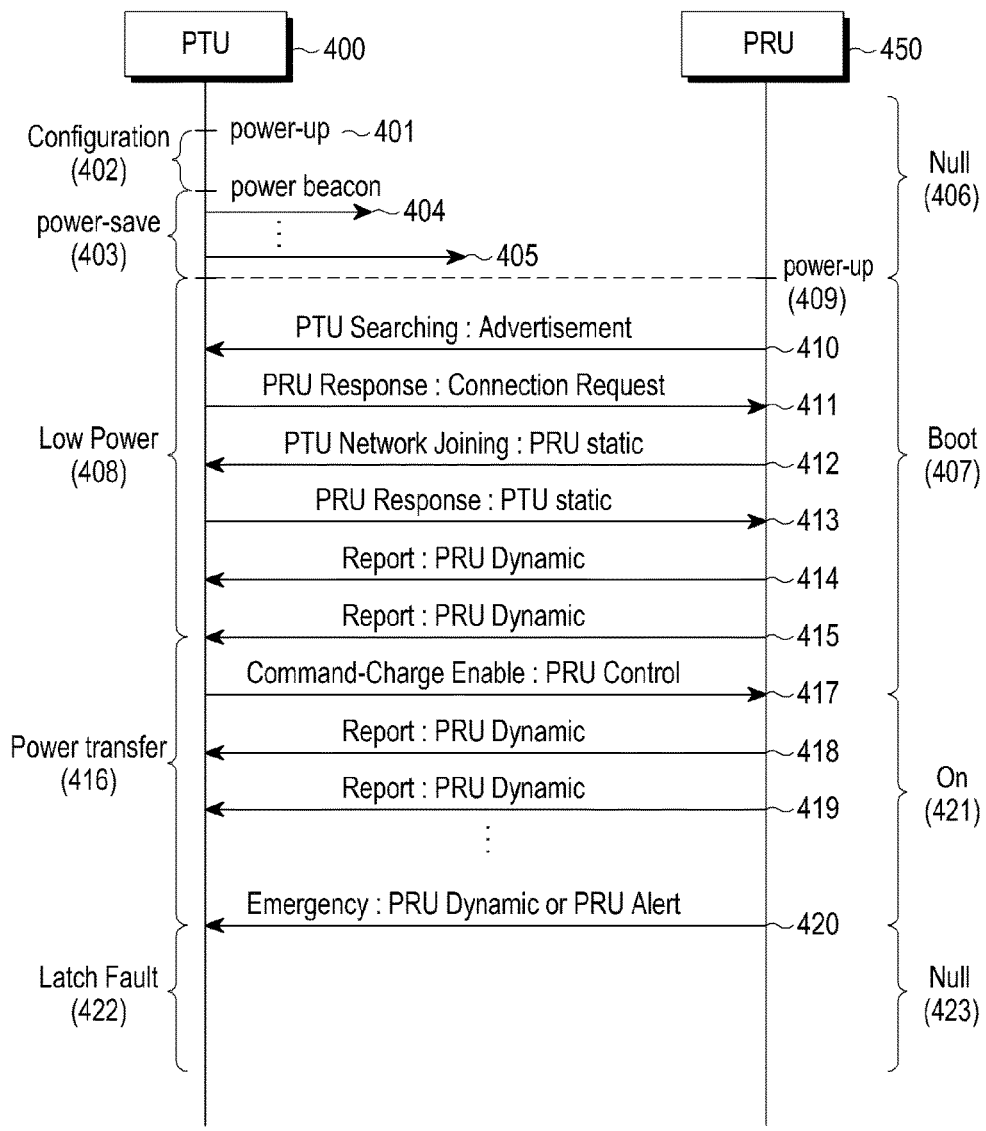
FIG. 4 schematically illustrates an example of an operation between a PTU and a PRU in a wireless charging network according to an embodiment of the present disclosure.

FIG. 4 schematically illustrates an example of an operation between a PTU and a PRU in a wireless charging network according to an embodiment of the present disclosure.

Referring to FIG. 4, the wireless charging network includes a PTU 400 and a PRU 450. The PTU 400 supplies power at operation 401. If the power is supplied, the PTU 400 may configure an environment at operation 402.

The PTU 400 enters a power saving mode at operation 403. In the power saving mode, the PTU 400 applies different types of power detection beacons by their own periods, this will be described in more detail with reference to FIG. 6, and a detailed description thereof will be omitted herein. For example, in FIG. 4, the PTU 400 may apply power detection beacons at operations 404 and 405, and power values of the power detection beacons may be different. A part or all of the power detection beacons may have power enough to drive a communication unit included in the PRU 450. For example, the PRU 450 may drive the communication unit by the part or all of the power detection beacons to communicate with the PTU 400 at operation 406. The above state will be referred to as a null state.

The PTU 400 detects load change due to an arrangement of the PRU 450. The PTU 400 enters a low power mode at operation 408. The low power mode will be described with reference to FIG. 6, and a detailed description will be omitted herein. The PRU 450 drives a communication unit based on power received from the PTU 400 at operation 409.

The PRU 450 transmits a PTU searching signal to the PTU 400 at operation 410. The PRU 450 may transmit the PTU searching signal as an advertisement message which is based on a BLE scheme. The PRU 450 may periodically transmit the PTU searching signal. The PRU 450 may transmit the PTU searching signal until the PRU 450 receives a response signal from the PTU 400 or it reaches a preset time.

Upon receiving the PTU searching signal from the PRU 450, the PTU 400 transmits a PRU response signal at operation 411. The PRU response signal may be used for establishing a connection between the PTU 400 and the PRU 450.

The PRU 450 transmits a PRU static signal at operation 412. The PRU static signal may be a signal indicating a state of the PRU 450, and may request to join a wireless charging network which the PTU 400 manages.

The PTU 400 transmits a PTU static signal at operation 413. The PTU static signal which the PTU 400 transmits may be a signal indicating capability of the PTU 400.

If the PTU 400 and the PRU 450 transmit/receive the PRU static signal and the PTU static signal, the PRU 450 periodically transmits a PRU dynamic signal at operations 414 and 415. The PRU dynamic signal may include at least one parameter which is measured in the PRU 450. For example, the PRU dynamic signal may include power information of a back end of a rectifier of the PRU 450. The state of the PRU 450 will be referred to as a boot state at operation 407.

The PTU 400 enters a power transfer mode at operation 416, and transmits a PRU control signal as a command signal which commands the PRU 450 to perform a charging operation at operation 417. In the power transfer mode, the PRU 450 may transmit charging power.

The PRU control signal transmitted by the PRU 450 may include information enabling/disabling the charging of the PRU 450 and permission information. The PRU control signal may be transmitted whenever a charging state is changed. The PRU control signal may be transmitted, for example, every 250 ms, or transmitted if a parameter is changed. The PRU control signal may be set to be transmitted within preset threshold time, for example, within 1 sec even though the parameter is not changed.

The PRU 450 changes a configuration based on the PRU control signal and transmits the PRU dynamic signal for reporting the state of PRU 450 at operations 418 and 419. The PRU dynamic signal transmitted by the PRU 450 may include at least one of information on a voltage, information on a current, information on a state of the PRU 450, and information on temperature. The state of the PRU 450 will be referred to as an on state at operation 421.

The PRU dynamic signal may have a data structure as shown in Table 1.

TABLE 1

| Field | Octets | Description | Use | Units |
| --- | --- | --- | --- | --- |
| optional fields | 1 | defines which optional fields are populated | mandatory | |
| Vrect | 2 | DC voltage at the output of the rectifier. | mandatory | mV |
| Irect | 2 | DC current at the output of the rectifier. | mandatory | mA |
| Vout | 2 | voltage at charge/battery port | optional | mV |
| Iout | 2 | current at charge/battery port | optional | mA |
| temperature | 1 | temperature of PRU | optional | Deg. C. from −40 C. |

TABLE 1-continued

| Field | Octets | Description | Use | Units |
|---|---|---|---|---|
| Vrect min dyn | 2 | The current dynamic minimum rectifier voltage desired | optional | mV |
| Vrect set dyn | 2 | desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

In Table 1, the PRU dynamic signal may include at least one field. The at least one field includes optional field information, voltage information of a back end of a rectifier of a PRU (Vrect), current information of the back end of the rectifier of the PRU (Irect), voltage information of a back end of a DC/DC converter of the PRU (Vout), current information of the back end of the DC/DC converter of the PRU (Iout), temperature information (temperature), minimum voltage value information of the back end of the rectifier of the PRU (Vrect min dyn), optimal voltage value information of the back end of the rectifier of the PRU (Vrect set dyn), maximum voltage value information of the back end of the rectifier of the PRU (Vrect high dyn), alert information (PRU alert), and the like. The PRU dynamic signal may include at least one of the above fields.

For example, at least one voltage setting value (e.g., the minimum voltage value information (Vrect min dyn) of the back end of the rectifier of the PRU, the optimal voltage value information (Vrect set dyn) of the back end of the rectifier of the PRU, and the maximum voltage value information (Vrect high dyn) of the back end of the rectifier of the PRU, and the like) determined according to a charging state may be included in a corresponding field and then transmitted. As described above, the PTU which receives the PRU dynamic signal controls wireless charging voltage to be transmitted to each PRU based on the voltage setting values included in the PRU dynamic signal.

The PRU alert information may be formed as a data structure as shown in Table 2.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

In Table 2, the PRU alert information (PRU Alert) may include a bit for a restart request, a bit for a transition, and a bit for detecting an insertion of a travel adapter (TA) (TA detect). The bit for the TA detect indicates a bit informing that a terminal for wired charging is connected to a PRU providing wireless charging. The transition indicates a bit informing a PTU that a PRU is reset before a communication integrated circuit (IC) of the PRU is switched from an SA mode to an NSA mode. The bit for the restart request indicates a bit informing a PRU that a PTU is ready to restart charging when the charging is disconnected due to the PTU reducing power because of an over-current state or an over-temperature state and then the state returning to a normal state.

Further, the PRU alert information may also be formed as a data structure as shown in Table 3.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

In Table 3, PRU alert information includes an over voltage field, an over current field, an over temperature field, a PRU self protection field, a charge complete field, a wired charger detect field, a mode transition field, and the like. If the over voltage field is set to 1, it may indicate that a voltage Vrect of a PRU exceeds a limit of the over voltage. Further, the over current field and the over temperature field may be set in the same way as the over voltage field. The PRU self protection field indicates that a PRU directly reduced a load of power and thus needs to protect itself. In this case, the PRU is not required to change to a charging state.

Bits for a mode transition according to an embodiment of the present disclosure may be set to a value necessary for notifying a duration that a mode transition procedure is performed to a PTU. The bits for the mode transition may be expressed as Table 4.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

In Table 4, '00' indicates that there is no mode transition, '01' indicates that time which is required for completing mode transition is a maximum of 2 seconds, '10' indicates that time which is required for completing mode transition is a maximum of 3 seconds, and '11' indicates that time which is required for completing mode transition is a maximum of 6 seconds.

For example, when 3 seconds or less are spent for completing a mode transition, the mode transition bit may be set as '10'. Prior to starting a mode transition procedure, a PRU may restrict the procedure such that there is no change in impedance during the mode transition procedure. The restriction is implemented by changing an input impedance setting to match 1.1 W power draw. So, a PTU may control power (ITX_COIL) for the PRU based on the setting, and accordingly, maintain the power (ITX_COIL) for the PRU during a mode transition period.

So, if the mode transition period is set by the mode transition bit, the PTU may maintain the power (ITX_COIL) for the PRU during the mode transition time, e.g., 3 seconds. That is, the PTU may maintain a connection even though a response is not received from the PRU for 3 seconds. However, after the mode transition time passes, the PTU unit may be considered a rogue object (foreign substance) and thus power transmission may be terminated.

Referring back to FIG. 4, the PRU 450 may detect an error occurrence. The PRU 450 transmits an alert signal to the PTU 400 at operation 420. The alert signal may be transmitted in a form of a PRU dynamic signal or a PRU alert signal. For example, the PRU 450 may transmit a PRU alert field of Table 1 reflecting an error state to the PTU 400. Alternatively, the PRU 450 may transmit a single alert signal indicating the error state to the PTU 400. Upon receiving the alert signal, the PTU 400 enters a latch fault mode at operation 422, and the PTU 450 enters a null state at operation 423.

An example of an operation between a PTU and a PRU in a wireless charging network according to an embodiment of the present disclosure has been described with reference to FIG. 4, and another example of an operation between a PTU and a PRU in a wireless charging network according to an embodiment of the present disclosure will be described with reference to FIG. 5.

Figure 5:
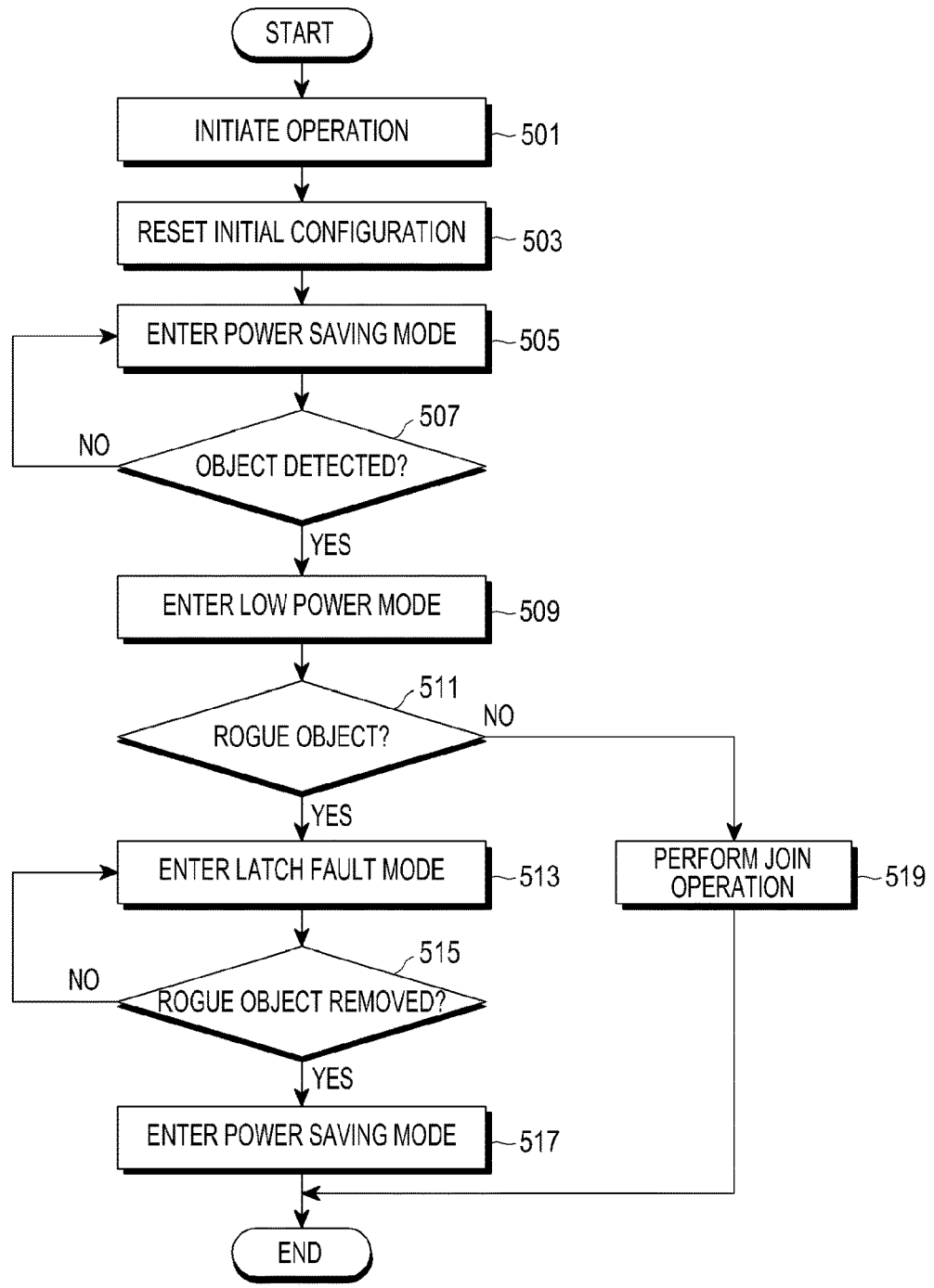
FIG. 5 schematically illustrates another example of an operation between a PTU and a PRU in a wireless charging network according to an embodiment of the present disclosure.

FIG. 5 schematically illustrates another example of an operation between a PTU and a PRU in a wireless charging network according to an embodiment of the present disclosure.

Another example of an operation between a PTU and a PRU in a wireless charging network in FIG. 5 will be described in more detail with reference to FIG. 6.

Figure 6:
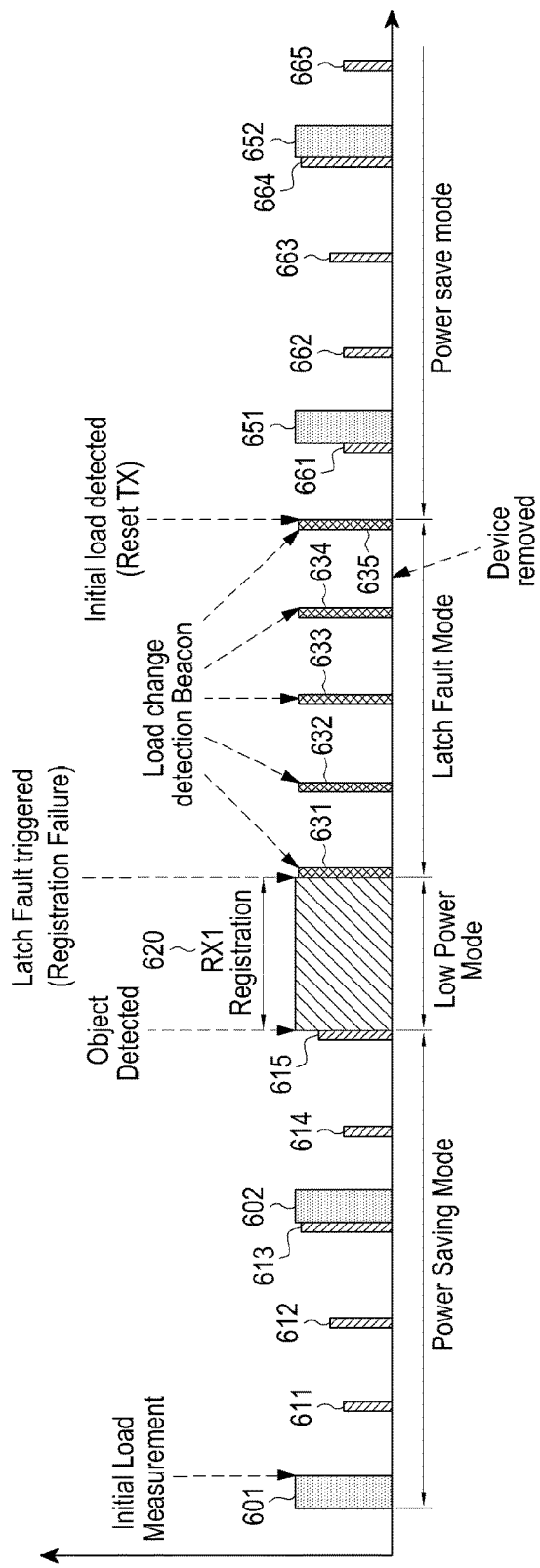
FIG. 6 schematically illustrates a graph on a time axis of a power amount which a PTU in FIG. 5 applies.

FIG. 6 schematically illustrates a graph on a time axis of a power amount which a PTU in FIG. 5 applies.

As shown in FIG. 5, a PTU initiates an operation at operation 501. The PTU resets an initial configuration at operation 503. The PTU transits into a power saving mode at operation 505. The power saving mode may be a duration that the PTU supplies a different power to a power transmitter. For example, the power saving mode may be a duration that the PTU supplies a second detection power 601 and 602 and a third detected power 611, 612, 613, 614, and 615 as described in FIG. 6 to a power transmitter. The PTU may periodically supply the second detection power 601 and 602 by a second period. If the second detection power 601 and 602 are supplied, the PTU may supply the second detection power 601 and 602 during a second duration. The PTU may periodically supply the third detection power 611, 612, 613, 614, and 615 by a third period. If the third detection power 611, 612, 613, 614, and 615 are supplied, the PTU may supply the third detection power 611, 612, 613, 614, and 615 during a third duration. In FIG. 6, power of each of the third detection power 611, 612, 613, 614, and 615 is different, however, the power of each of the third detection power 611, 612, 613, 614, and 615 may be different or the same.

The PTU may output the third detection power 611 and then output the third detection power 612 having the same power amount. As described above, if the PTU outputs the third detection power having the same power amount, the power amount of the third detection power may have a power amount by which a smallest PRU, e.g., a PRU designated as category 1 can be detected. For example, a category may be determined based on a size of a PRU, and a description thereof will be omitted herein.

Alternatively, the PRU may output the third detection power 611 and then output the third detection power 612 having a different power amount. As described above, if the PTU outputs the third detection power having the different power amount, each of the power amounts of the third detection power may be a power amount by which the PRUs designated as category 1 to category 5 can be detected. For example, the third detection power 611 may have a power amount by which a PRU designated as category 5 can be detected, the third detection power 612 may have a power amount by which a PRU designated as category 3 can be detected, and the third detection power 613 may have a power amount by which a PRU designated as category 1 can be detected.

Meanwhile, the second detection power 601 and 602 may be power which may drive the PRU. More specifically, the second detection power 601 and 602 may have a power amount which may drive the controller and the communication unit included in the PRU.

The PTU may supply the second detection power 601 and 602 and the third detection power 611, 612, 613, 614, and 615 to the power receiver by a second period and a third period, respectively. If the PRU is arranged on the PTU, impedance viewed from a point of the PTU may be changed. The PTU detects a change in the impedance while the second detection power 601 and 602 and the third detection power 611, 612, 613, 614, and 615 are supplied. For example, the PTU may detect the change in the impedance while the third detection power 615 is supplied.

So, the PTU may detect an object at operation 507. If the object is not detected at operation 507, the PTU maintains a power saving mode in which different power is periodically supplied at operation 505.

Meanwhile, if there is the change in the impedance and thus the object is detected at operation 507, the PTU enters a low power mode at operation 509. The low power mode is a mode in which the PTU supplies driving power having a power amount by which the controller and the communication unit included in the PRU may be driven. For example, in FIG. 6, the PTU supplies driving power 620 to a power transmitter. The PRU receives the driving power 620 to drive a controller and a communication unit. The PRU performs a communication with the PTU with a predetermined scheme based on the driving power 620. For example, the PRU may transmit/receive data required for an authentication and join a wireless charging network managed by the PTU based on the data. However, if a rogue object, not the PRU, is arranged, data transmission/reception may not be performed. So, the PTU determines whether the arranged object is a rogue object at operation 511. For example, if the PTU does not receive a response from the object within preset time, the PTU may determine the object is a rogue object.

If the object is determined as the rogue object at operation 511, the PTU enters a latch fault mode at operation 513. If the object is not determined as the rogue object at operation 511, the PTU performs a join operation at operation 519. For example, the PTU may periodically supply first power 631 to 634 by a first period in FIG. 6. The PTU may detect a change in impedance while supplying the first power. For example, if the rogue object is removed at operation 515, the PTU may detect an impedance change and determine that the rogue object is removed. If the rogue object is not removed at operation 515, the PTU may not detect the impedance change and determine that the rogue object is not removed.

If the rogue object is not removed, the PTU may output at least one of a lamp and a warning sound to inform a user that a state of the PTU is an error state. So, the PTU may include an output unit that outputs at least one of the lamp and the warning sound.

If it is determined that the rogue object is not removed at operation 515, the PTU maintains the latch fault mode at operation 513. If it is determined that the rogue object is removed at operation 515, the PTU enters the power saving mode again at operation 517. For example, the PTU may supply the second power 651 and 652 and the third power 661 to 665, as shown in FIG. 6.

As described above, if the rogue object not the PRU is arranged, the PTU enters the latch fault mode. Further, the PTU may determine whether the rogue object is removed based on the impedance change which is based on the power supplied in the latch fault mode. That is, a condition of the entrance into the latch fault mode in an embodiment of FIGS. 5 and 6 may be the arrangement of the rogue object.

Meanwhile, the PTU may have various latch fault mode entrance conditions as well as the arrangement of the rogue object. For example, the PTU may be cross-connected with the arranged PRU, in this case, the PTU may enter the latch fault mode.

So, if the cross-connection occurs, the PTU is required to return to an initial state and the PRU is required to be removed. The PTU may set the cross-connection by which the PRU arranged on another PTU joins the wireless charging network as the latch fault mode entrance condition.

An operation of a PRU in a case that an error including a cross connection occurs in a wireless charging network according to an embodiment of the present disclosure will be described with reference to FIG. 7.

The control method in FIG. 7 will be described in more detail with reference to FIG. 8.

Figure 7:
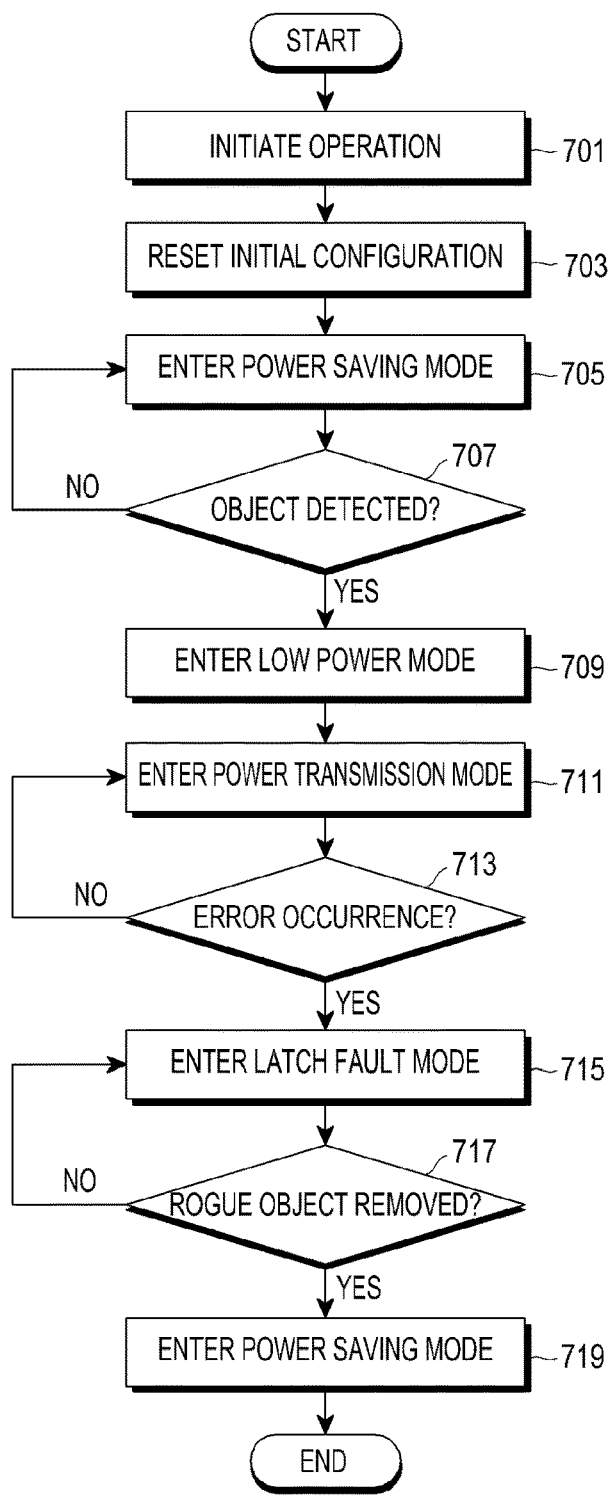
FIG. 7 schematically illustrates an operation of a PRU in a case that an error including a cross-connection occurs in a wireless charging network according to an embodiment of the present disclosure.
Figure 8:
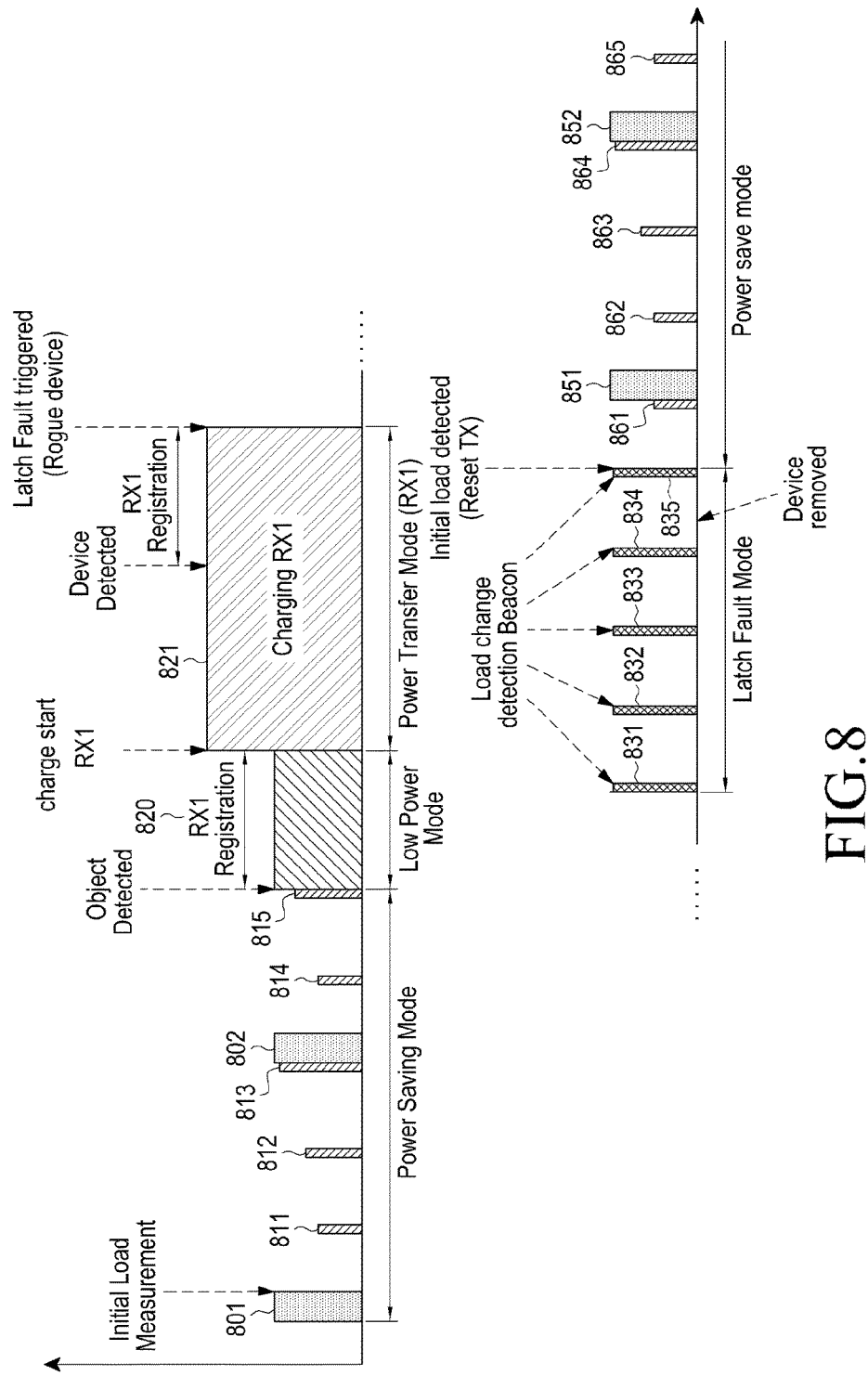
FIG. 8 schematically illustrates a graph on a time axis of an amount of power which a PTU in FIG. 7 supplies.

FIG. 8 schematically illustrates a graph on a time axis of an amount of power which a PTU in FIG. 7 supplies.

The PTU initiates an operation at operation 701. Further, the PTU resets an initial configuration at operation 703. The PTU enters a power saving mode at operation 705. The power saving mode may be an interval that the PTU supplies power having a different amount to a power transmitter. For example, the power saving mode may be an interval that the PTU supplies second detection power 801 and 802 and third detection power 811, 812, 813, 814, and 815 to a power transmitter in FIG. 8. The PTU may periodically supply the second detection power 801 and 802 by a second period. If the PTU supplies the second detection power 801 and 802, the PTU may supply the second detection power 801 and 802 during a second interval. The PTU may periodically supply the third detection power 811, 812, 813, 814, and 815 by a third period. If the PTU supplies the third detection power 811, 812, 813, 814, and 815, the PTU may supply the third detection power 811, 812, 813, 814, and 815 during a third interval. Meanwhile, although it is illustrated that power values of the third detection power 811, 812, 813, 814, and 815 are different from each other, the power values of the third detection power 811, 812, 813, 814, and 815 may be different or the same.

Meanwhile, the second detection power 801 and 802 may be power which may drive a PRU. More specifically, the second detection power 801 and 802 may have a power amount which may drive a controller and a communication unit included in the PRU.

The PTU may supply the second detection power 801 and 802 and the third detection power 811, 812, 813, 814, and 815 to the power receiver by a second period and a third period, respectively. If the PRU is arranged on the PTU, impedance viewed from a point of the PTU may be changed. The PTU may detect an impedance change while the second detection power 801 and 802 and the third detection power 811, 812, 813, 814, and 815 are supplied. For example, the PTU may detect the impedance change while the third detection power 815 is supplied. So, the PTU may detect an object at operation 707. If the object is not detected at operation 707, the PTU maintains a power saving mode in which different power is periodically supplied at operation 705.

Meanwhile, if the impedance is changed and thus the object is detected at operation 707, the PTU enters a low power mode at operation 709. The low power mode is a mode in which the PTU supplies driving power having a power amount by which a controller and a communication unit included in the PRU may be driven. For example, in FIG. 8, the PTU may supply driving power 820 to the power transmitter. The PRU receives the driving power 820 to drive the controller and the communication unit. The PRU may perform a communication with the PTU with a preset scheme based on the driving power 820. For example, the PRU may transmit/receive data required for an authentication and join a wireless charging network managed by the PTU based on the data.

Thereafter, the PTU enters a power transmission mode in which charging power is transmitted at operation 711. For example, the PTU supplies charging power 821 and the charging power may be transmitted to the PRU as illustrated in FIG. 8.

At operation 713, the PTU may determine whether an error occurs in a power transmission mode. The error may be the arrangement of a rogue object on the PTU, a cross-connection, an over voltage, an over current, over temperature, and the like. The PTU may include a sensing unit that may measure the over voltage, the over current, over temperature, and the like. For example, the PTU may measure a voltage or a current at a reference position. If the measured voltage or current is larger than a threshold, it is determined that a condition of the over voltage or the over current is satisfied. Alternatively, the PTU may include a temperature sensing means which measures temperature at the reference position of the PTU. If the temperature at the reference position is larger than a threshold, the PTU determines that a condition of the over temperature is satisfied.

Meanwhile, if an over voltage, over current, or over temperature state is determined according to a measurement value of the temperature, voltage, or current, the PTU prevents the over voltage, over current, or over temperature by reducing a wireless charging power by a preset value. At this time, if a voltage value of the reduced wireless charging power is less than a preset minimum value (for example, a minimum voltage value (Vrect min dyn) of a back end of a rectifier of the PRU), the wireless charging is stopped, so that a voltage setting value may be re-adjusted according to an embodiment of the present disclosure.

Although it has been illustrated that the error occurs since the rogue object is additionally arranged on the PTU in an embodiment of FIG. 8, the error is not limited thereto and it will be easily understood by those skilled in the art that the PTU operates through a similar process with respect to the arrangement of the rogue object, the cross-connection, the over voltage, the over current, and the over temperature.

If the error does not occur at operation 713, the PTU maintains a power transmission mode at operation 711. If the error occurs at operation 713, the PTU enters a latch fault mode at operation 715. For example, the PTU supplies first power 831 to 835 as illustrated in FIG. 8.

Further, the PTU may output an error occurrence display including at least one of a lamp and a warning sound during the latch fault mode. If it is determined that the rogue object is not removed at operation 717, the PTU maintains the latch fault mode at operation 715.

Meanwhile, if it is determined that the rogue object is removed at operation 717, the PTU enters the power saving mode again at operation 719. For example, the PTU may supply second power 851 and 852 and third power 861 to 865 in FIG. 8.

In the above description, an operation in a case that an error occurs while a PTU transmits charging power has been discussed. Hereinafter, an operation in a case that a plurality of PRUs on a PTU receives charging power will be described.

An operation of a PTU in a wireless charging network according to an embodiment of the present disclosure will be described with reference to FIG. 9.

Figure 9:
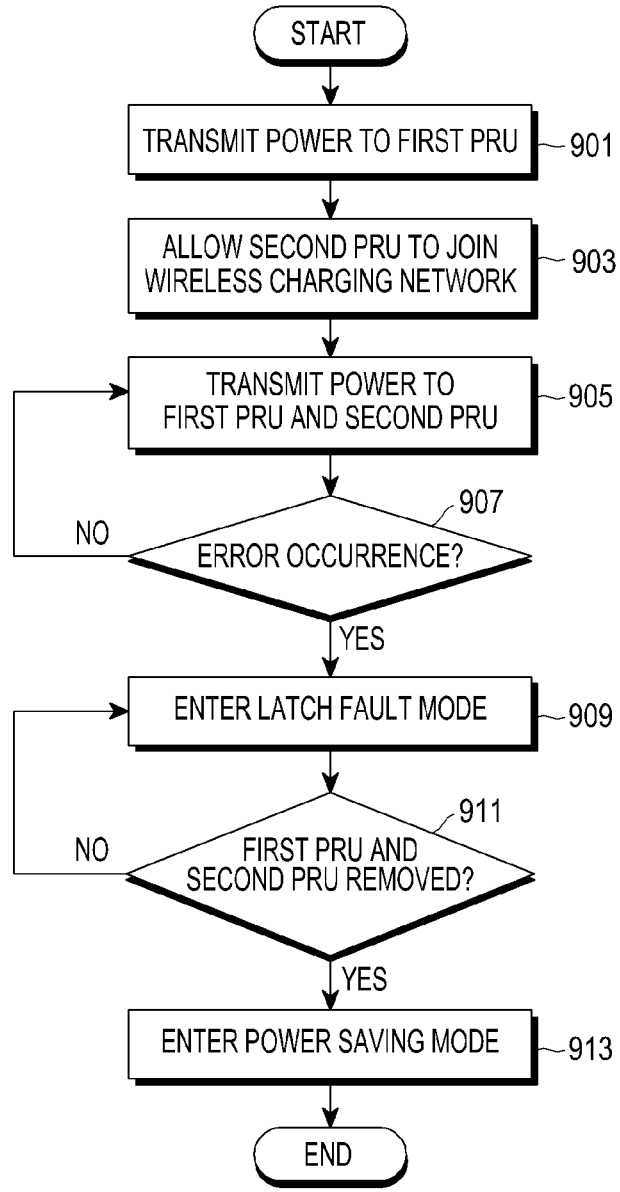
FIG. 9 schematically illustrates an operating process of a PTU in a wireless charging network according to an embodiment of the present disclosure.

FIG. 9 schematically illustrates an operating process of a PTU in a wireless charging network according to an embodiment of the present disclosure.

The operating process in FIG. 9 will be described in more detail with reference to FIG. 10.

Figure 10:
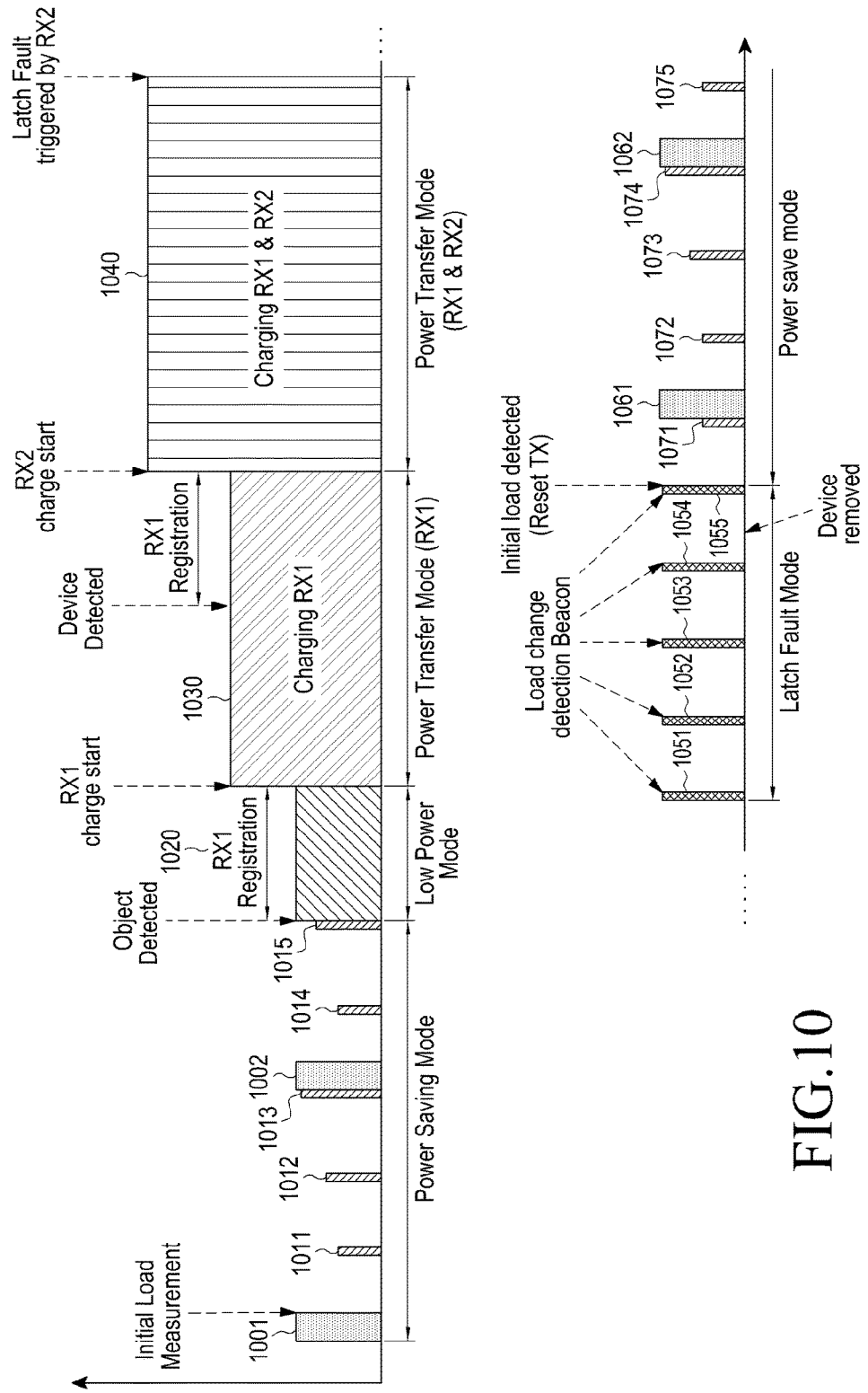
FIG. 10 is a graph on an x axis of an amount of power supplied by a PTU in FIG. 9.

FIG. 10 is a graph on an x axis of an amount of power supplied by a PTU in FIG. 9.

As illustrated in FIG. 9, a PTU transmits charging power to a first PRU at operation 901. The PTU allows a second PRU to additionally join a wireless charging network at operation 903. The PTU transmits charging power to the first and the second PRU at operation 905. More specifically, the PTU supplies a sum of the charging power required by the first PRU and the second PRU to a power receiver.

An embodiment of operations 901 to 905 is illustrated in FIG. 10. For example, the PTU maintains a power saving mode that second detection power 1001 and 1002 and third detection power 1011 to 1015 are supplied. Thereafter, the PTU detects the first PRU and enters a low power mode in which a detection power 1020 is maintained. Then, the PTU enters a power transmission mode that first charging power 1030 is supplied. The PTU detects the second PRU and allows the second PRU to join the wireless charging network. Further, the PTU may supply second charging power 1040 having a power amount corresponding to a sum of the power amount required by the first PRU and the second PRU.

Referring back to FIG. 9, the PTU detects an error occurrence at operation 907 while transmitting charging power to both the first PRU and the second PRU at operation 905. Here, the error may be arrangement of a rogue object, cross-connection, an over voltage, an over current, an over temperature, and the like. If the error does not occur at operation 907, the PTU may maintain the supply of the second charging power 1040.

If the error occurs at operation 907, the PTU enters a latch fault mode at operation 909. For example, the PTU may supply first power 1051 to 1055 by a first period in FIG. 10. The PTU determines whether both the first PRU and the second PRU are removed at operation 911. For example, the PTU may detect an impedance change while supplying the first power 1051 to 1055. The PTU may determine whether both the first PRU and the second PRU are removed based on whether impedance is returned to an initial value.

If it is determined that both the first PRU and the second PRU are removed at operation 911, the PTU enters a power saving mode at operation 913. For example, as described in FIG. 10, the PTU may supply second power 1061 and 1062 and third power 1071 to 1075 by a second period and a third period, respectively.

As described above, even if the PTU applies charging power to a plurality of PRUs, the PTU may easily determine whether the PRU or a rogue object is removed when an error occurs.

An inner structure of each of a PTU and a PRU in a stand-alone (SA) mode in a wireless charging network according to an embodiment of the present disclosure will be described with reference to FIG. 11.

Figure 11:
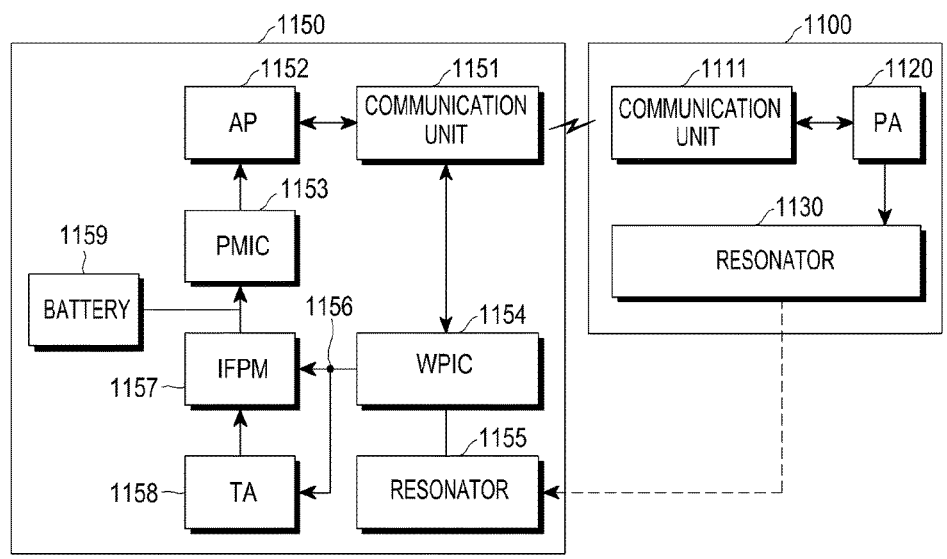
FIG. 11 schematically illustrates an inner structure of each of a PTU and a PRU in an SA mode in a wireless charging network according to an embodiment of the present disclosure.

FIG. 11 schematically illustrates an inner structure of each of a PTU and a PRU in an SA mode in a wireless charging network according to an embodiment of the present disclosure.

Referring to FIG. 11, a PTU 1100 includes a communication unit 1111, a power amplifier (PA) 1120, and a resonator 1130. The PRU 1150 includes a communication unit 1151, an application processor (AP) 1152, a power management integrated circuit (PMIC) 1153, a wireless power integrated circuit (WPIC) 1154, a resonator 1155, an interface power management IC (IFPM) 1157, a travel adapter (TA) 1158, and a battery 1159.

The communication unit 1111 may be implemented with a WiFi/BT combo IC, and may perform a communication with the communication unit 1151 based on a preset scheme, e.g., a BLE scheme. For example, the communication unit 1151 included in the PRU 1150 may transmit a PRU dynamic signal with a data structure as described in Table 1 to the communication unit 1111 included in the PTU 1100.

As described above, a PRU dynamic signal may include at least one of voltage information, current information, and alert information of the PRU 1150.

Based on a received PRU dynamic signal, a power value output from the PA 1120 may be adjusted. For example, if the over voltage, the over current, and the over temperature are applied to the PRU 1150, a power value output from the PA 1120 may be reduced. Further, if a voltage or current of the PRU 1150 is less than a preset value, a power value output from the PA 1120 may be increased.

Charging power from the resonator 1130 may be wirelessly transmitted to the resonator 1155.

The WPIC 1154 rectifies the charging power received from the resonator 1155 and performs DC/DC conversion. The WPIC 1154 drives the communication unit 1151 or charges the battery 1159 using the converted power.

Meanwhile, a wired charging terminal may be inserted into the TA 1158. A wired charging terminal such as 30-pin connector or a universal serial bus (USB) connector may be inserted into the TA 1158, and the TA 1158 may receive power supplied from an external power source to charge the battery 1159.

The IFPM 1157 may process power supplied from the wired charging terminal to output the processed power to the battery 1159 and the PMIC 1153.

The PMIC 1153 manages wirelessly received power or power received through a wire, and power supplied to each of components of the PRU 1150. The AP 1152 receives power information from the PMIC 1153 and controls the communication unit 1151 to transmit the PRU dynamic signal for reporting the power information.

The TA 1158 may be connected to a node 1156 connected to the WPIC 1154. If a wired charging connector is inserted into the TA 1158, a preset voltage, for example, 5V may be supplied to the node 1156. The WPIC 1154 monitors voltage supplied to the node 1156 to determine whether the TA 1158 is inserted.

Meanwhile, the AP 1152 has a stack in a predetermined communication scheme, for example, a WiFi/BT/BLE stack. So, in the wireless charging, the communication unit 1151 loads the stack from the AP 1152 and then communicates with the communication unit 1111 included in the PTU 1100 using a BT or BLE communication scheme based on the stack.

However, a state may occur in which data for performing a wireless power transmission may not be fetched from the AP 1152 since the AP 1152 is turned off or in which power is lost so that the AP 1152 may not remain in an on state while the data is fetched from a memory within the AP 1152.

If a residual capacity of the battery 1159 is less than a minimum power threshold, the AP 1152 is turned off, and the wireless charging may be performed using some components for the wireless charging within the PRU 1150, for example, the communication unit 1151, the WPIC 1154, and the resonator 1155. A state in which the AP 1152 may not be turned on will be referred to as a dead battery state.

Since the AP 1152 is not driven in the dead battery state, the communication unit 1151 may not receive a stack in a predetermined communication scheme, for example, a WiFi/BT/BLE stack from the AP 1152. For such a case, some of the stacks in the predetermined communication scheme, for example, the BLE stack, are fetched within a memory of the communication unit 1151 from the AP 1152 and stored in the memory. Accordingly, the communication unit 1151 may communicate with the PTU 1100 for the wireless charging using the stack in the communication scheme stored in the memory, that is, a wireless charging protocol. At this time, the communication unit 1151 may include a memory, and the BLE stack may be stored in a memory in a form of a read only memory (ROM) in the SA mode.

As described above, a mode in which the communication unit 1151 performs the communication using the stack of the communication scheme stored in the memory will be referred to as the SA mode. Accordingly, the communication unit 1151 may manage a charging process based on the BLE stack.

The concept of a wireless charging network which is applicable to an embodiment of the present disclosure has been described with reference to FIGS. 1 to 11.

A process of transmitting/receiving PTU presence information in a wireless charging network according to an embodiment of the present disclosure will be described with reference to FIGS. 12 to 26.

An advertisement procedure and a discovery procedure in a conventional wireless charging network will be described with reference to FIG. 12.

Figure 12:
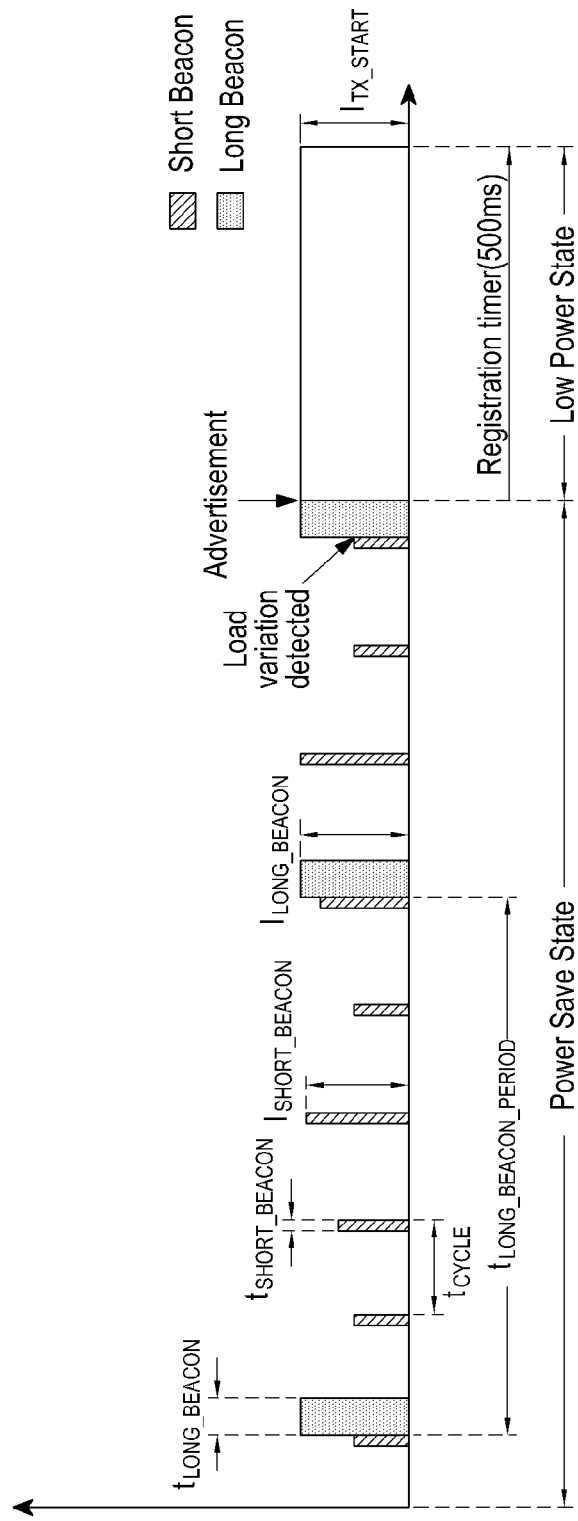
FIG. 12 schematically illustrates an advertisement procedure and a discovery procedure in a conventional wireless charging network.

FIG. 12 schematically illustrates an advertisement procedure and a discovery procedure in a conventional wireless charging network.

Referring to FIG. 12, the wireless charging network supports a BLE scheme. In order for a PTU to supply power to a PRU, there is a need of establishing a BLE connection between the PTU and the PRU. So, the PTU and the PRU need to establish the BLE connection. The BLE connection is used for determining whether the PRU is compatible with the PTU and controlling wireless power supply.

If the BLE connection is not established between the PTU and the PRU yet, the PTU performs an advertisement procedure and the PRUs perform a discovery procedure to establish a BLE connection with the PTU. The advertisement procedure is a procedure that transmits an advertisement message without limiting receiving devices, and the discovery procedure is a procedure that discovers the advertisement message.

In FIG. 12, a short beacon is periodically transmitted, and used for detecting an impedance shift. A long beacon is periodically transmitted, and used for receiving the advertisement message. The long beacon is transmitted during tLONG_BEACON, and a period of the long beacon is tLONG_BEACON_PERIOD. The short beacon is transmitted during tSHORT_BEACON, and a period of the short beacon is tCYCLE.

Regardless of a preset period, upon detecting that an impedance shift occurs using the short beacon, the PTU may transmit the long beacon as soon as possible from a time when the PTU detects the impedance shift.

When the PTU discovers a PRU using a discovery procedure, if the following two conditions are satisfied, the PRU may perform an operation of establishing a BLE connection and transmitting power:

(1) Condition 1: Case that a received signal strength of an advertisement message which a PTU receives is greater than or equal to a preset threshold for a received signal strength.

That is, if the received signal strength of the received advertisement message is greater than or equal to the preset threshold received signal strength, the PTU performs an operation of establishing a BLE connection and transmitting power by performing remaining procedures with a related PRU. For example, the received signal strength may be determined based on various metrics such as received signal code power (RSCP), reference signal received power (RSRP), a reference signal strength indicator (RSSI), reference signal received quality (RSRQ), a carrier-to-interference noise ratio (CINR), a signal-to-noise ratio (SNR), a block error rate (BLER), and the like. The threshold received signal strength may be set to an ADV_PWR_MIN value used in an A4WP standard.

(2) Condition 2: Case that a PTU detects an impedance shift at a time which is close to a time that the PTU receives an advertisement message. For example, the time which is close to the time that the PTU receives the advertisement message may be a time within a preset threshold time from the time that the PTU receives the advertisement message. The impedance shift occurs if the PTU is very close to a related PRU, that is, a distance between the PTU and the related PRU is shorter than a threshold distance.

That is, upon detecting the impedance shift at the time that is close to the time that the PTU receives the advertisement message, the PTU performs an operation of establishing a BLE connection and transmitting power by performing remaining procedures with a related PRU.

As described in FIG. 12, in a conventional wireless charging network, if a condition 1 and a condition 2 are satisfied, a PTU performs an operation to establish a BLE connection and transmit power by performing remaining procedures. So, if at least one of the condition 1 and the condition 2 is not satisfied, the PTU ignores an advertisement message received from a PRU, so the operation of establishing the BLE connection and transmitting the power is not performed between the PTU and the PRU.

If one of the condition 1 and the condition 2 is satisfied, the PTU transmits a connection request message to the PRU when the PTU receives a specific advertisement message, for example, the eleventh advertisement message from the PRU or a preset time (e.g., 1700 ms) elapses.

If power is not supplied to a resonator included in the PTU, i.e., the PTU is in a un-powered state, even though the PTU receives an advertisement message from a related PRU, the PTU ignores the advertisement message.

So, an embodiment of the present disclosure proposes a new operating process for a case that in which condition 1 and a condition 2 are not satisfied and an advertisement message may be discovered, and a case that only a condition 1 is satisfied. That is, an embodiment of the present disclosure proposes a PTU detection operation for a case that a received signal strength condition of a BLE scheme is satisfied even though a PRU is not close enough to cause an impedance shift to a PTU, and a case that the PTU may detect a related advertisement message even though the PRU is not close enough to cause the impedance shift to the PTU and the received signal strength condition of the BLE scheme is not satisfied. This will be described below.

An example of an operating process of a PTU in a wireless charging network according to an embodiment of the present disclosure will be described with reference to FIG. 13.

Figure 13:
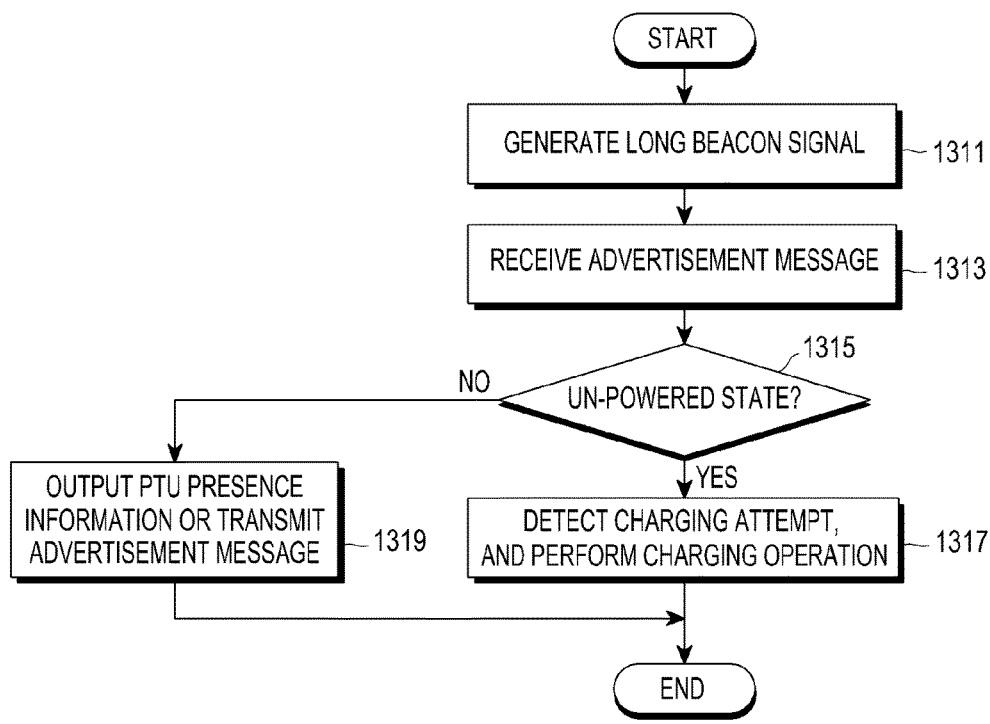
FIG. 13 schematically illustrates an example of an operating process of a PTU in a wireless charging network according to an embodiment of the present disclosure.

FIG. 13 schematically illustrates an example of an operating process of a PTU in a wireless charging network according to an embodiment of the present disclosure.

Referring to FIG. 13, it will be assumed that the PTU is connected to a management server.

A PTU generates a long beacon signal at operation 1311. The PTU receives an advertisement message from a PRU at operation 1313. The PTU determines whether a state of the PTU is an un-powered state, i.e., a state in which power is not supplied to a resonator included in the PTU at operation 1315. If the state of the PTU is the un-powered state, the PTU detects a charging attempt from the PRU, and performs a charging operation with the PRU at operation 1317. That is, the PTU transmits power to the PRU. It will be understood by those of ordinary skill in the art that the charging operation is not performed between the PTU and the PRU if the PTU does not detect the charging attempt.

If the state of the PTU is the not an un-powered state, the PTU generates an alarm, that is, the PTU outputs PTU presence information or transmits PTU presence information to a management server through an advertisement message at operation 1319. The alarm indicates that the PTU exists, and may be implemented with various forms. The alarm will be described below, so a detailed description will be omitted herein. The advertisement message may include various parameters. A process of transmitting the advertisement message to the management server in the PTU will be described below, so a detailed description will be omitted herein.

As described in FIG. 13, a PTU may perform a charging operation with a PRU even though power is not supplied to a resonator, that is, the PTU is in a un-powered state. That is, as described in FIG. 13, in an embodiment of the present disclosure, the PTU may perform the charging operation with the PRU in a case that a received signal strength condition of a BLE scheme is satisfied even though the PRU is not close enough to cause an impedance shift to the PTU, and a case that the PTU may detect a related advertisement message even though the PRU is not close enough to cause the impedance shift to the PTU and the received signal strength condition of the BLE scheme is not satisfied.

Although FIG. 13 illustrates an example of an operating process of a PTU in a wireless charging network according to an embodiment of the present disclosure, various changes could be made to FIG. 13. For example, although shown as a series of operations, various operations in FIG. 13 could overlap, occur in parallel, occur in a different order, or occur multiple times.

An example of an operating process of a PTU in a wireless charging network according to an embodiment of the present disclosure has been described with reference to FIG. 13, and another example of an operating process of a PTU in a wireless charging network according to an embodiment of the present disclosure will be described with reference to FIG. 14.

Figure 14:
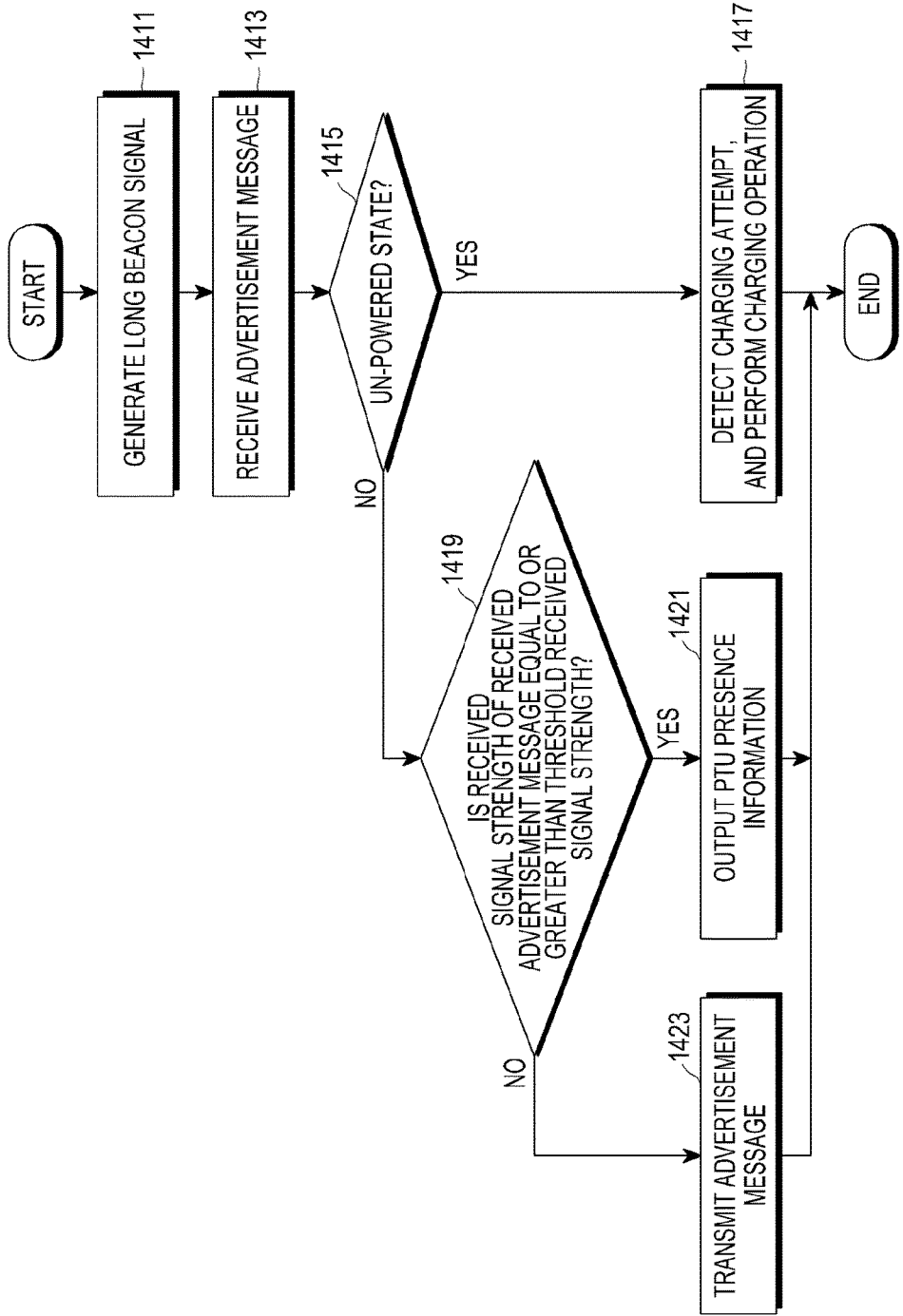
FIG. 14 schematically illustrates another example of an operating process of a PTU in a wireless charging network according to an embodiment of the present disclosure.

FIG. 14 schematically illustrates another example of an operating process of a PTU in a wireless charging network according to an embodiment of the present disclosure.

Referring to FIG. 14, it will be assumed that the PTU is connected to a management server.

A PTU generates a long beacon signal at operation 1411. The PTU receives an advertisement message from a PRU at operation 1413. The PTU determines whether a state of the PTU is an un-powered state, i.e., a state that power is not supplied to a resonator included in the PTU at operation 1415. If the state of the PTU is the un-powered state, the PTU detects a charging attempt from the PRU, and performs a charging operation with the PRU at operation 1417. That is, the PTU transmits power to the PRU. It will be understood by those of ordinary skill in the art that the charging operation is not performed between the PTU and the PRU if the PTU does not detect the charging attempt.

If the state of the PTU is the not un-powered state, the PTU determines whether received signal strength of an advertisement message received from the PRU is greater than or equal to a preset threshold received signal strength at operation 1419. The threshold received signal strength may be adaptively set according to a state of the wireless charging network. For example, the threshold received signal strength may be set to an ADV_PWR_MIN value used in an A4WP standard.

If the received signal strength is greater than or equal to the threshold received signal strength, the PTU generates an alarm, that is, the PTU outputs PTU presence information at operation 1421. The alarm indicates that the PTU exists, and may be implemented with various forms. The alarm will be described below, so a detailed description will be omitted herein.

If the received signal strength is not greater than or equal to the threshold received signal strength, that is, the received signal strength is less than the threshold received signal strength, the PTU transmits PTU presence information to a management server through an advertisement message at operation 1423. The advertisement message may include various parameters. A process of transmitting the advertisement message to the management server in the PTU will be described below, so a detailed description will be omitted herein.

As described in FIG. 14, a PTU may perform a charging operation with a PRU even though power is not supplied to a resonator, that is, the PTU is in a un-powered state. That is, as described in FIG. 14, in an embodiment of the present disclosure, the PTU may perform the charging operation with the PRU in a case that a received signal strength condition of a BLE scheme is satisfied, even though the PRU is not close enough to cause an impedance shift to the PTU, and a case that the PTU may detect a related advertisement message even though the PRU is not close enough to cause the impedance shift to the PTU, and the received signal strength condition of the BLE scheme is not satisfied.

Although FIG. 14 illustrates another example of an operating process of a PTU in a wireless charging network according to an embodiment of the present disclosure, various changes could be made to FIG. 14. For example, although shown as a series of operations, various operations in FIG. 14 could overlap, occur in parallel, occur in a different order, or occur multiple times.

Another example of an operating process of a PTU in a wireless charging network according to an embodiment of the present disclosure has been described with reference to FIG. 14, and an example of outputting PTU presence information in a wireless charging network according to an embodiment of the present disclosure will be described with reference to FIG. 15.

Figure 15:
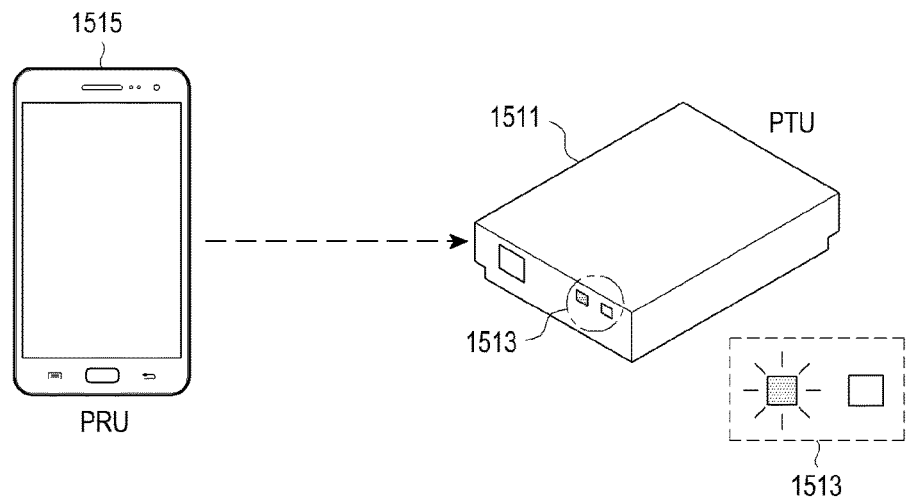
FIG. 15 schematically illustrates an example of outputting PTU presence information in a wireless charging network according to an embodiment of the present disclosure.

FIG. 15 schematically illustrates an example of outputting PTU presence information in a wireless charging network according to an embodiment of the present disclosure.

Referring to FIG. 15, the wireless charging network includes a PTU 1511 and a PRU 1515. The PTU 1511 outputs PTU presence information indicating that that the PTU 1511 exists periodically or if a specific condition is satisfied. The specific condition may be a condition as described in FIGS. 13 and 14, so a detailed description will be omitted herein.

In FIG. 15, the PTU 1511 outputs the PTU presence information indicating that the PTU 1511 exists using a display unit, for example, by a flickering light emitting diode (LED). Although not shown in FIG. 15, it will be understood by those of ordinary skill in the art that the PTU 1511 may output the PTU presence information indicating that the PTU 1511 exists using a display unit, for example, by generating a beep or playing a voice message.

An example of outputting PTU presence information in a wireless charging network according to an embodiment of the present disclosure has been described with reference to FIG. 15, and another example of outputting PTU presence information in a wireless charging network according to an embodiment of the present disclosure will be described with reference to FIG. 16.

Figure 16:
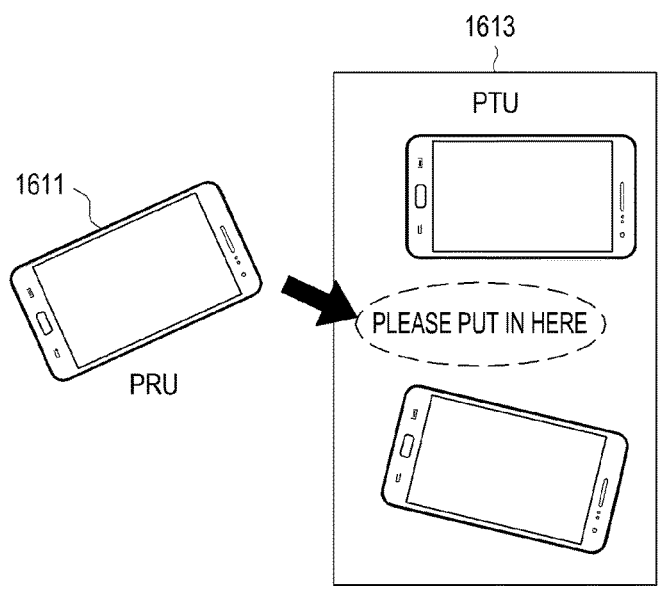
FIG. 16 schematically illustrates another example of outputting PTU presence information in a wireless charging network according to an embodiment of the present disclosure.

FIG. 16 schematically illustrates another example of outputting PTU presence information in a wireless charging network according to an embodiment of the present disclosure.

Referring to FIG. 16, the wireless charging network includes a PRU 1611 and a PTU 1613. The PTU 1613 outputs PTU presence information indicating that the PTU 1613 exists periodically and if a specific criterion is satisfied. The specific criterion may be a criterion as described in FIGS. 13 and 14, so a detailed description thereof will be omitted herein.

In FIG. 16, the PTU 1613 outputs PTU presence information indicating that the PTU 1613 exists using a display unit, for example, by displaying a specific message 'Please put in here' on a liquid crystal display (LCD). Although not shown in FIG. 16, it will be understood by those of ordinary skill in the art that the PTU 1613 may output the PTU presence information indicating that the PTU 1613 exists using the display unit, for example, by generating a beep or playing a voice message.

Another example of outputting PTU presence information in a wireless charging network according to an embodiment of the present disclosure has been described with reference to FIG. 16, and an example of a process of transmitting PTU presence information to a PRU through a management server in a PTU in a wireless charging network according to an embodiment of the present disclosure will be described with reference to FIG. 17.

Figure 17:
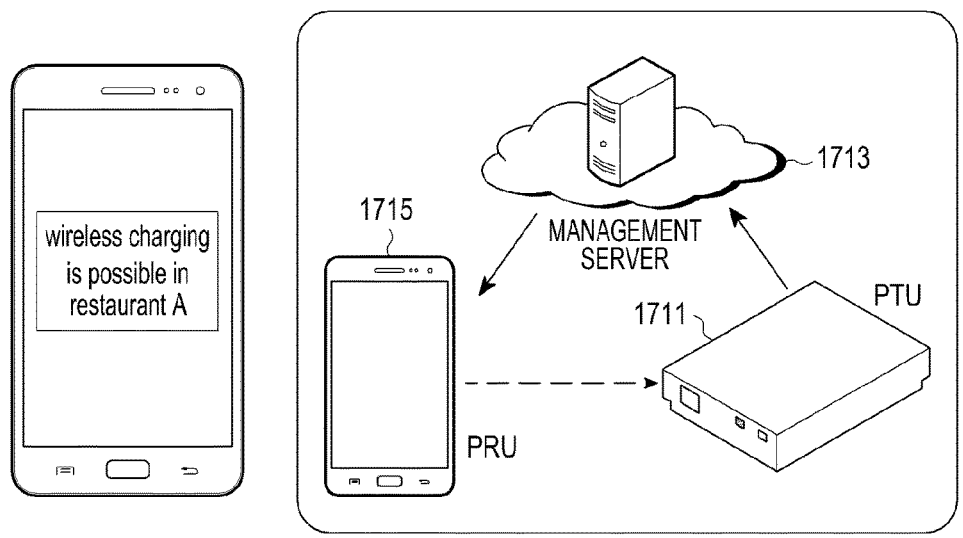
FIG. 17 schematically illustrates an example of a process of transmitting PTU presence information to a PRU through a management server in a PTU in a wireless charging network according to an embodiment of the present disclosure.

FIG. 17 schematically illustrates an example of a process of transmitting PTU presence information to a PRU through a management server in a PTU in a wireless charging network according to an embodiment of the present disclosure.

Referring to FIG. 17, the wireless charging network includes a PTU 1711, a management server 1713, and a PRU 1715.

The PTU 1711 transmits PTU presence information indicating that the PTU 1711 exists through an advertisement message to the management server 1713 periodically or if a specific criterion is satisfied. The management server 1713 transmits the PTU presence information to the PRU 1715 based on the advertisement message received from the PTU 1711. The specific criterion may be a criterion as described in FIGS. 13 and 14, so a detailed description thereof will be omitted herein.

The advertisement message may include various parameters, and the various parameters may indicate the PTU presence information. For example, the various parameters may be at least one of a parameter indicating geographical location of the PTU 1711 and a parameter indicating location that it is possible to perform a wireless charging operation using the PTU 1711, and the like. The parameter indicating the a geographical location of the PTU 1711 may not be included in the advertisement message. In this case, it will be assumed that the management server 1713 previously knows the geographical location of the PTU 1711.

Upon receiving the advertisement message from the PTU 1711, the management server 1713 may transmit PTU presence information indicating that the PTU 1711 exists based on a location of PRUs to related PRUs, e.g., the PRU 1715. The management server 1713 determines PRUs to which the management server 1713 will transmit PTU information based on a location information of PRUs and accuracy information, e.g., quality of position (QoP) stored in the management server 1713. The management server 1713 transmits the PTU presence information to the determined PRUs, e.g., the PRU 1715.

Upon receiving the PTU presence information from the management server 1713, the PRU 1715 outputs the PTU presence information. A case that the PTU presence information is output based on a parameter indicating a location that it is possible to perform a wireless charging operation using the PTU 1711 is shown in FIG. 17. That is, the PRU 1715 outputs a message "Wireless charging is possible in restaurant A" on a display unit of the PRU 1715 based on the PTU presence information received from the management server 1713.

Although not shown in FIG. 17, the PRU 1715 may output the PTU presence information indicating that the PTU 1711 exists using a display unit, e.g., by generating a beep or playing a voice message.

An example of a process of transmitting PTU presence information to a PRU through a management server in a PTU in a wireless charging network according to an embodiment of the present disclosure has been described with reference to FIG. 17, and an example of a process of transmitting PTU presence information to a PRU in a management server in a wireless charging network according to an embodiment of the present disclosure will be described with reference to FIG. 18.

Figure 18:
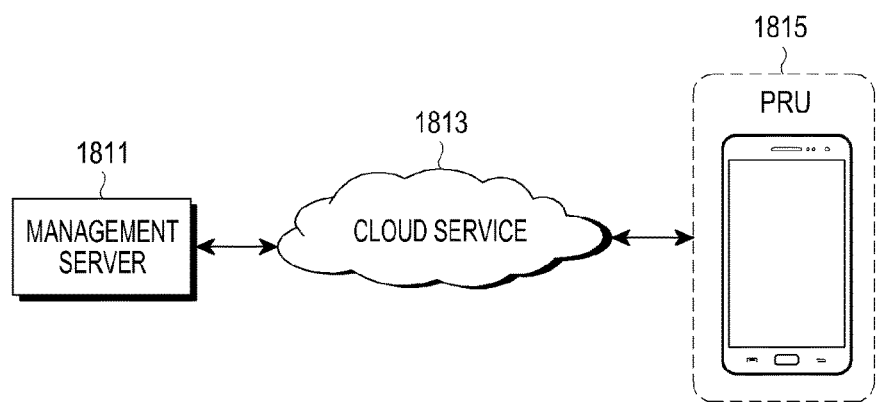
FIG. 18 schematically illustrates an example of a process of transmitting PTU presence information to a PRU in a management server in a wireless charging network according to an embodiment of the present disclosure.

FIG. 18 schematically illustrates an example of a process of transmitting PTU presence information to a PRU in a management server in a wireless charging network according to an embodiment of the present disclosure.

Referring to FIG. 18, the wireless charging network includes a management server 1811 and a PRU 1815. For example, the management server 1811 transmits PTU presence information to the PRU 1815 through a cloud service

1813. The cloud service 1813 may be implemented with various forms, and a detailed description thereof will be omitted herein.

An example of a process of transmitting PTU presence information to a PRU in a management server in a wireless charging network according to an embodiment of the present disclosure has been described with reference to FIG. 18, and another example of a process of transmitting PTU presence information to a PRU in a management server in a wireless charging network according to an embodiment of the present disclosure will be described with reference to FIG. 19.

Figure 19:
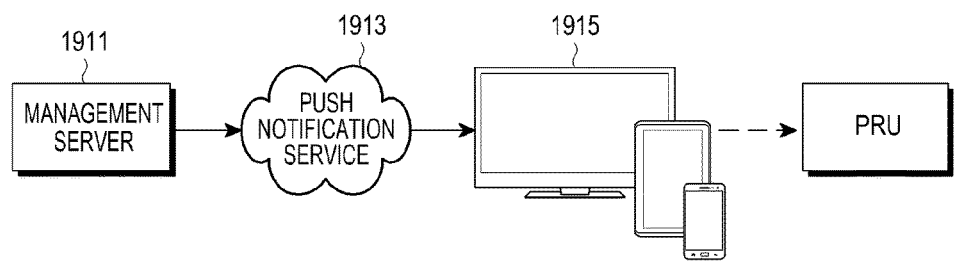
FIG. 19 schematically illustrates another example of a process of transmitting PTU presence information to a PRU in a management server in a wireless charging network according to an embodiment of the present disclosure.

FIG. 19 schematically illustrates another example of a process of transmitting PTU presence information to a PRU in a management server in a wireless charging network according to an embodiment of the present disclosure.

Referring to FIG. 19, the wireless charging network includes a management server 1911 and a PRU 1915. For example, the management server 1911 transmits PTU presence information to the PRU 1915 through a push notification service 1913. The push notification service 1913 may be implemented with various forms, and a detailed description thereof will be omitted herein.

Another example of a process of transmitting PTU presence information to a PRU in a management server in a wireless charging network according to an embodiment of the present disclosure has been described with reference to FIG. 19. A process of transmitting wireless charging operation state information for a specific PRU to an associated PRU which is associated with the specific PRU in a state that a wireless charging operation is performed between a PTU and the specific PRU in a wireless charging network according to an embodiment of the present disclosure will be described with reference to FIG. 20.

Figure 20:
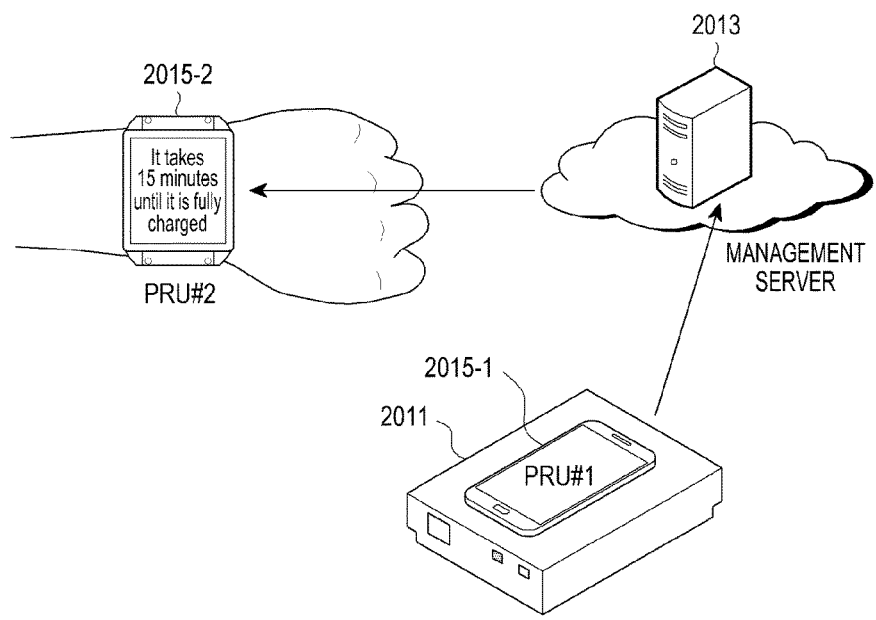
FIG. 20 schematically illustrates a process of transmitting wireless charging operation state information for a specific PRU to an associated PRU which is associated with the specific PRU in a state that a wireless charging operation is performed between a PTU and the specific PRU in a wireless charging network according to an embodiment of the present disclosure.

FIG. 20 schematically illustrates a process of transmitting wireless charging operation state information for a specific PRU to an associated PRU which is associated with the specific PRU in a state that a wireless charging operation is performed between a PTU and the specific PRU in a wireless charging network according to an embodiment of the present disclosure.

Referring to FIG. 20, the wireless charging network includes a PTU 2011, a management server 2013, a PRU#1 2015-1, and a PRU#2 2015-2. It will be assumed that the PRU#1 2015-1 and the PRU#2 2015-2 are PRUs which have a relationship.

As described in FIG. 20, upon performing a wireless charging operation with the PRU#1 2015-1, the PTU 2011 transmits wireless charging operation state information indicating a wireless charging operation state between the PTU 2011 and the PRU#1 2015-1 to the PRU#2 2015-2 through the management server 2013. The wireless charging operation state information may include information indicating a current charging state of the PRU#1 2015-1, information indicating time until it is predicted that the PRU#1 2015-1 is fully charged, and the like.

For example, the management server 2013 transmits wireless charging operation state information for the PRU#1 2015-1 to another PRU which works with a service account of the PRU#1 2015-1 using a push alarm. The wireless charging operation state information helps a user of the PRU#1 2015-1 to easily know wireless charging related information even though power of the PRU#1 2015-1 is exhausted.

Upon receiving the wireless charging operation state information for the PRU#1 2015-1 from the management server 2013, the PRU#2 2015-2 outputs the PTU presence information. In FIG. 20, the wireless charging operation state information includes information indicating a time that it is expected until the PRU#1 2015-1 is fully charged. That is, the PRU#2 2015-2 displays a message, e.g., a message "It takes 15 minutes until it is fully charged" on a display unit included in the PRU#2 2015-2 based on the wireless charging operation state information received from the management server 2013.

Although not shown in FIG. 20, the PRU#2 2015-2 may output wireless charging operation state information for the PRU#1 2015-1 using a display unit, e.g., by generating a beep or playing a voice message.

A process of transmitting wireless charging operation state information for a specific PRU to an associated PRU which is associated with the specific PRU in a state that a wireless charging operation is performed between a PTU and the specific PRU in a wireless charging network according to an embodiment of the present disclosure has been described with reference to FIG. 20. An example of an operating process of a mobile type PTU in a wireless charging network according to an embodiment of the present disclosure will be described with reference to FIG. 21.

Figure 21:
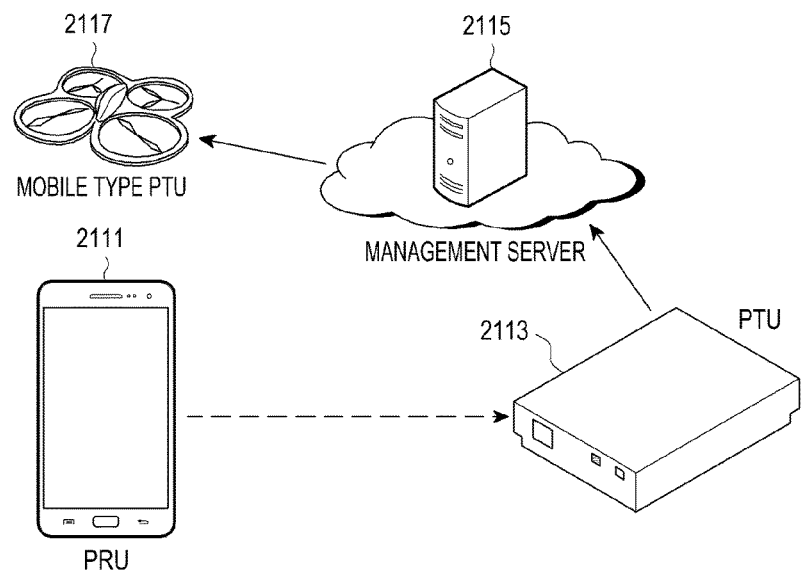
FIG. 21 schematically illustrates an example of an operating process of a mobile type PTU in a wireless charging network according to an embodiment of the present disclosure.

FIG. 21 schematically illustrates an example of an operating process of a mobile type PTU in a wireless charging network according to an embodiment of the present disclosure.

Referring to FIG. 21, the wireless charging network includes a PRU 2111, a PTU 2113, a management server 2115, and a mobile type PTU 2117. The mobile type PTU 2117 may have an associated relation with the PTU 2113, and controls the PRU 2111 to perform a wireless charging operation through the mobile type PTU 2117 if the management server 2115 detects a location of the PRU 2111. That is, the management server 2115 transmits an advertisement message including PTU presence information indicating a location of the mobile type PTU 2117 to the PRU 2111. Thus, the PRU 2111 may perform a wireless charging operation with the mobile type PTU 2117. The mobile type PTU 2117 performs a wireless charging operation with the PRU 2111 under a control of the management server 2115 unlike a conventional PTU. That is, a location of the mobile type PTU 2117 may be changed under a control of the management server 2115. The location of the mobile type PTU 2117 may be a location which has been already registered at the management server 2115, or location of the PRU 2111 which the management server 2115 detects.

An example of an operating process of a mobile type PTU in a wireless charging network according to an embodiment of the present disclosure has been described with reference to FIG. 21, and another example of an operating process of a mobile type PTU in a wireless charging network according to an embodiment of the present disclosure will be described with reference to FIG. 22.

Figure 22:
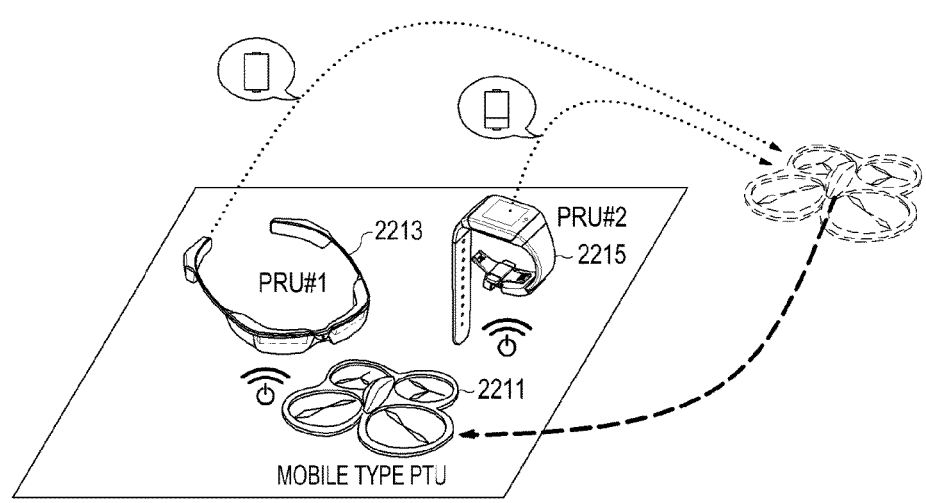
FIG. 22 schematically illustrates another example of an operating process of a mobile type PTU in a wireless charging network according to an embodiment of the present disclosure.

FIG. 22 schematically illustrates another example of an operating process of a mobile type PTU in a wireless charging network according to an embodiment of the present disclosure.

Referring to FIG. 22, the wireless charging network includes a mobile type PTU 2211, a PRU#1 2213, and a PRU#2 2215. The mobile type PTU 2211 may have a relation with a PTU (not show in FIG. 22), and performs a wireless charging operation with a PRU which is detected through the mobile type PTU 2211 if a management server (not show in FIG. 22) detects a location of at least one of the PRU#1 2213 and the PRU#2 2215. The mobile type PTU 2211 performs a wireless charging operation with the detected PRU under a control of the management server unlike a conventional PTU. That is, a location of the mobile type PTU 2211 may be changed under a control of the management server. The location of the mobile type PTU 2211 may be a location that is previously registered at the management server or location of a PRU that the management server detects.

Another example of an operating process of a mobile type PTU in a wireless charging network according to an embodiment of the present disclosure has been described with reference to FIG. 22, and still another example of an operating process of a mobile type PTU in a wireless charging network according to an embodiment of the present disclosure will be described with reference to FIG. 23.

Figure 23:
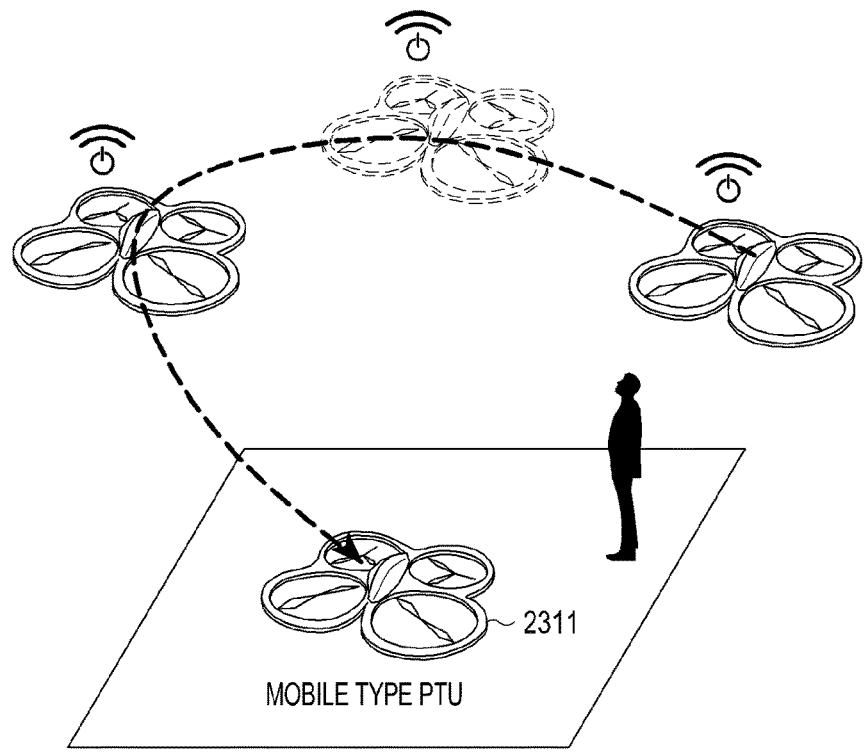
FIG. 23 schematically illustrates still another example of an operating process of a mobile type PTU in a wireless charging network according to an embodiment of the present disclosure.

FIG. 23 schematically illustrates another example of an operating process of a mobile type PTU in a wireless charging network according to an embodiment of the present disclosure.

Referring to FIG. 23, the wireless charging network includes a mobile type PTU 2311. The mobile type PTU 2311 may have an associated relationship with a PTU (not shown in FIG. 23), and controls a management server (not shown in FIG. 23) to perform a wireless charging operation with a PRU (not shown in FIG. 23) which is detected through the mobile type PTU 2311 if the management server detects location of the PRU. The mobile type PTU 2311 performs a wireless charging operation with the PRU under a control of the management server unlike a conventional PTU. That is, location of the mobile type PTU 2311 may be changed under a control of the management server. The location of the mobile type PTU 2311 may be a location that is previously registered at the management server or location of the PRU that the management server detects.

For example, if the PRU performs a beacon service such as an iBeacon, and the like, a PRU which transmits a BLE beacon is deployed at a place that physical access is difficult, e.g., a ceiling in order to prevent the BLE beacon from being stolen and damaged. In this case, the mobile type PTU 2311 may result in convenience of management related to how a PRU actively performs a charging operation if power of the related PRU is insufficient. Further, the mobile type PTU 2311 may include an additional binder device in order to supply power without consuming energy for maintaining a levitation state.

Another example of an operating process of a mobile type PTU in a wireless charging network according to an embodiment of the present disclosure has been described with reference to FIG. 23, and an inner structure of a PTU in a wireless charging network according to an embodiment of the present will be described with reference to FIG. 24.

Figure 24:
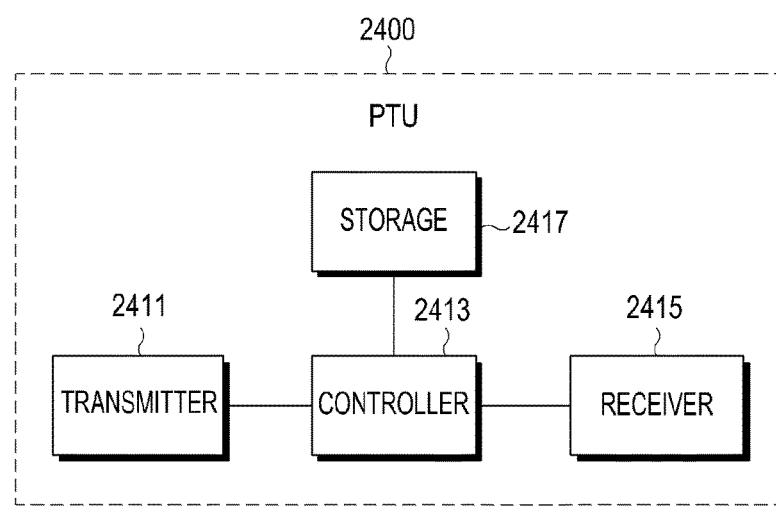
FIG. 24 schematically illustrates an inner structure of a PTU in a wireless charging network according to an embodiment of the present.

FIG. 24 schematically illustrates an inner structure of a PTU in a wireless charging network according to an embodiment of the present.

Referring to FIG. 24, a PTU 2400 includes a transmitter 2411, a controller 2413, a receiver 2415, and a storage unit 2417.

The controller 2413 controls the overall operation of the PTU 2400. More particularly, the controller 2413 controls the PTU 2400 to perform a wireless charging operation according to an embodiment of the present disclosure, e.g., an operation related to an operation of transmitting PTU presence information. The operation related to the operation of transmitting the PTU presence information according to an embodiment of the present disclosure is performed in the manner described with reference to FIGS. 1 to 23, and a description thereof will be omitted herein.

The transmitter 2411 transmits various signals, various messages, and the like to a management server, a PRU, and the like under a control of the controller 2413. The various signals, the various messages, and the like transmitted in the transmitter 2411 have been described in FIGS. 1 to 23, and a description thereof will be omitted herein.

The receiver 2415 receives various signals, various messages, and the like from the management server, the PRU, and the like under a control of the controller 2413. The various signals, the various messages and the like received in the receiver 2415 have been described in FIGS. 1 to 23, and a description thereof will be omitted herein.

The storage unit 2417 stores a program and various data necessary for the operation of the PTU 2400, information related to the operation of transmitting the PTU presence information according to an embodiment of the present disclosure, and the like. The storage unit 2417 stores the various signals, the various messages, and the like received in the receiver 2415.

While the transmitter 2411, the controller 2413, the receiver 2415, and the storage unit 2417 are described as separate units, it is to be understood that this is merely for convenience of description. In other words, two or more of the transmitter 2411, the controller 2413, the receiver 2415, and the storage unit 2417 may be incorporated into a single unit.

An inner structure of a PTU in a wireless charging network according to an embodiment of the present has been described with reference to FIG. 24, and an inner structure of a PRU in a wireless charging network according to an embodiment of the present will be described with reference to FIG. 25.

Figure 25:
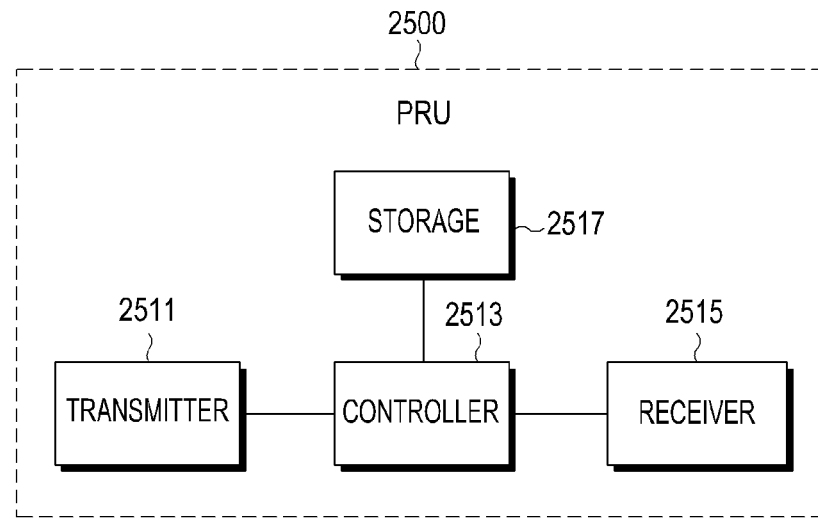
FIG. 25 schematically illustrates an inner structure of a PRU in a wireless charging network according to an embodiment of the present.

FIG. 25 schematically illustrates an inner structure of a PRU in a wireless charging network according to an embodiment of the present.

Referring to FIG. 25, a PRU 2500 includes a transmitter 2511, a controller 2513, a receiver 2515, and a storage unit 2517.

The controller 2513 controls the overall operation of the PRU 2500. More particularly, the controller 2513 controls the PRU 2500 to perform a wireless charging operation according to an embodiment of the present disclosure, e.g., an operation related to an operation of receiving PTU presence information. The operation related to the operation of receiving the PTU presence information according to an embodiment of the present disclosure is performed in the manner described with reference to FIGS. 1 to 23, and a description thereof will be omitted herein.

The transmitter 2511 transmits various signals, various messages, and the like to a management server, a PTU, and the like under a control of the controller 2513. The various signals, the various messages, and the like transmitted in the transmitter 2511 have been described in FIGS. 1 to 23, and a description thereof will be omitted herein.

The receiver 2515 receives various signals, various messages, and the like from the management server, the PTU, and the like under a control of the controller 2513. The various signals, the various messages and the like received in the receiver 2515 have been described in FIGS. 1 to 23, and a description thereof will be omitted herein.

The storage unit 2517 stores a program and various data necessary for the operation of the PRU 2500, information related to the operation of receiving the PTU presence information according to an embodiment of the present disclosure, and the like. The storage unit 2517 stores the various signals, the various messages, and the like received in the receiver 2515.

While the transmitter 2511, the controller 2513, the receiver 2515, and the storage unit 2517 are described as separate units, it is to be understood that this is merely for convenience of description. In other words, two or more of the transmitter 2511, the controller 2513, the receiver 2515, and the storage unit 2517 may be incorporated into a single unit.

An inner structure of a PRU in a wireless charging network according to an embodiment of the present has been described with reference to FIG. 25, and an inner structure of a management server in a wireless charging network according to an embodiment of the present will be described with reference to FIG. 26.

Figure 26:
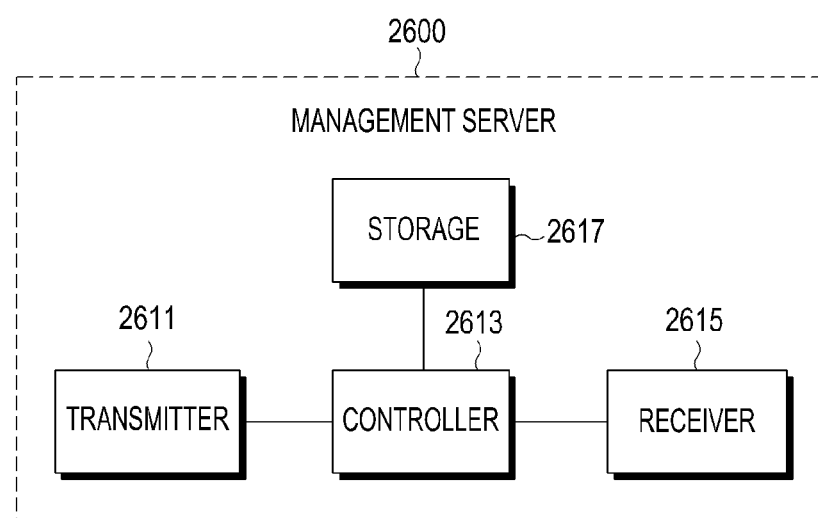
FIG. 26 schematically illustrates an inner structure of a management server in wireless charging network according to an embodiment of the present.

FIG. 26 schematically illustrates an inner structure of a management server in a wireless charging network according to an embodiment of the present.

Referring to FIG. 26, a management server 2600 includes a transmitter 2611, a controller 2613, a receiver 2615, and a storage unit 2617.

The controller 2613 controls the overall operation of the management server 2600. More particularly, the controller 2613 controls the management server 2600 to perform a wireless charging operation according to an embodiment of the present disclosure, e.g., an operation related to an operation of transmitting/receiving PTU presence information. The operation related to the operation of transmitting/receiving the PTU presence information according to an embodiment of the present disclosure is performed in the manner described with reference to FIGS. 1 to 23, and a description thereof will be omitted herein.

The transmitter 2611 transmits various signals, various messages, and the like to a PRU, a PTU, and the like under a control of the controller 2613. The various signals, the various messages, and the like transmitted in the transmitter 2611 have been described in FIGS. 1 to 23, and a description thereof will be omitted herein.

The receiver 2615 receives various signals, various messages, and the like from the PRU, the PTU, and the like under a control of the controller 2613. The various signals, the various messages and the like received in the receiver 2615 have been described in FIGS. 1 to 23, and a description thereof will be omitted herein.

The storage unit 2617 stores a program and various data necessary for the operation of the management server 2600, information related to the operation of transmitting/receiving the PTU presence information according to an embodiment of the present disclosure, and the like. The storage unit 2617 stores the various signals, the various messages, and the like received in the receiver 2615.

While the transmitter 2611, the controller 2613, the receiver 2615, and the storage unit 2617 are described as separate units, it is to be understood that this is merely for convenience of description. In other words, two or more of the transmitter 2611, the controller 2613, the receiver 2615, and the storage unit 2617 may be incorporated into a single unit.

As is apparent from the foregoing description, an embodiment of the present disclosure enables transmitting/receiving power transmitting unit (PTU) presence information in a wireless charging network.

An embodiment of the present disclosure enables transmitting/receiving PTU presence information based on a BLE scheme in a wireless charging network.

An embodiment of the present disclosure enables transmitting/receiving PTU presence information thereby enabling to transmit/receive PTU presence information when power is supplied to a resonator included in a PTU in a wireless charging network.

An embodiment of the present disclosure enables transmitting/receiving PTU presence information thereby enabling to transmit/receive PTU presence information even though power is supplied to a resonator included in a PTU and received signal strength of an advertisement message received from a PRU is less than threshold received signal strength in a wireless charging network.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting power transmitting unit (PTU) presence information by a PTU in a wireless charging network, the method comprising:
   receiving an advertisement message from a power receiving unit (PRU);
   determining whether power is not supplied to a resonator;
   determining whether signal strength of the advertisement message is greater than or equal to a threshold received signal strength, if the power is supplied to the resonator; and
   transmitting the PTU presence information indicating that the PTU exists to a management server, if the signal strength of the advertisement message received from the PRU is less than the threshold received signal strength,
   wherein the PTU presence information includes at least one of a parameter indicating a geographical location of the PTU or a parameter indicating a location which is possible to perform a charging operation.

2. The method of claim 1, further comprising:
   outputting the PTU presence information, if the received signal strength of the advertisement message is greater than or equal to the threshold received signal strength,
   wherein the outputting of the PTU presence information comprises performing at least one of an operation of generating a beep, an operation of displaying a message, or an operation of playing a voice message.

3. The method of claim 1, further comprising:
   determining whether a charging attempt is detected from the PRU if the power is not supplied to the resonator; and
   performing a charging operation with the PRU if the charging attempt is detected from the PRU.

4. The method of claim 1, wherein the PTU presence information is transmitted from the management server to a related PRU based on a location of the PRU.

5. The method of claim 1, wherein the transmitting of the PTU presence information to the management server comprises transmitting an advertisement message including the PTU presence information.

6. The method of claim 1, wherein a distance between the PRU and the PTU does not cause an impedance shift to the PTU.

7. A method for receiving power transmitting unit (PTU) presence information by a power receiving unit (PRU) in a wireless charging network, the method comprising:
   transmitting an advertisement message; and
   receiving the PTU presence information indicating that the PTU exists from a management server if signal strength of the advertisement message received from the PRU is less than a threshold received signal strength,
   wherein the PTU presence information includes at least one of a parameter indicating a geographical location of the PTU or a parameter indicating a location which is possible to perform a charging operation.

8. The method of claim 7, wherein the PTU presence information is transmitted from the management server to a related PRU based on a location of the PRU.

9. A power transmitting unit (PTU) in a wireless charging network, the PTU comprising:
   a transceiver configured to perform an operation of receiving an advertisement message from a power receiving unit (PRU); and
   a processor configured to perform an operation of determining whether power is not supplied to a resonator, an operation of determining whether signal strength of the advertisement message is greater than or equal to a threshold received signal strength if the power is supplied to the resonator, and an operation of controlling the transceiver to transmit PTU presence information indicating that the PTU exists to a management server, if the signal strength of the advertisement message received from the PRU is less than the threshold received signal strength,
   wherein the PTU presence information includes at least one of a parameter indicating a geographical location of the PTU or a parameter indicating a location which is possible to perform a charging operation.

10. The PTU of claim 9, wherein the PTU presence information is transmitted from the management server to a related PRU based on a location of the PRU.

11. The PTU of claim 9, wherein the processor performs an operation of determining whether a charging attempt is detected from the PRU if the power is not supplied to the resonator, and an operation of controlling to perform a charging operation with the PRU if the charging attempt is detected from the PRU.

12. The PTU of claim 9, wherein the processor performs an operation of outputting the PTU presence information, wherein the operation of outputting the PTU presence information comprises at least one of an operation of generating a beep, an operation of displaying a message, or an operation of playing a voice message.

13. The PTU of claim 9, wherein the operation of controlling the transceiver to transmit the PTU presence information to the management server comprises an operation of controlling the transceiver to transmit an advertisement message including the PTU presence information.

14. A power receiving unit (PRU) in a wireless charging network, the PRU comprising:
   a transceiver configured to perform an operation of transmitting an advertisement message; and
   a processor configured to perform an operation of receiving PTU presence information indicating that a power transmitting unit (PTU) exists from a management server if signal strength of the advertisement message received from the PRU is less than a threshold received signal strength,
   wherein the PTU presence information includes at least one of a parameter indicating a geographical location of the PTU or a parameter indicating a location which is possible to perform a charging operation.

15. The PRU of claim 14, wherein the PTU presence information is transmitted from the management server to a related PRU based on a location of the PRU.

* * * * *